(12) United States Patent
Chen et al.

(10) Patent No.: US 12,204,195 B2
(45) Date of Patent: Jan. 21, 2025

(54) ELECTRONIC DEVICE

(71) Applicant: InnoLux Corporation, Miao-Li County (TW)

(72) Inventors: En-Hsiang Chen, Miao-Li County (TW); Chih-Chin Kuo, Miao-Li County (TW); Mao-Shiang Lin, Miao-Li County (TW); Hsu-Kuan Hsu, Miao-Li County (TW); WenQi Lin, Miao-Li County (TW); Tzu-Chieh Lai, Miao-Li County (TW)

(73) Assignee: INNOLUX CORPORATION, Chu-Nan (TW)

( * ) Notice: Subject to any disclaimer, the term of this patent is extended or adjusted under 35 U.S.C. 154(b) by 0 days.

(21) Appl. No.: 18/414,152

(22) Filed: Jan. 16, 2024

(65) Prior Publication Data
US 2024/0272469 A1 Aug. 15, 2024

(30) Foreign Application Priority Data

Feb. 15, 2023 (CN) .......................... 202310116444.0
Jul. 13, 2023 (CN) .......................... 202310857766.0

(51) Int. Cl.
*G02F 1/1334* (2006.01)
*G02F 1/1335* (2006.01)
*G02F 1/137* (2006.01)

(52) U.S. Cl.
CPC ...... *G02F 1/1334* (2013.01); *G02F 1/133601* (2021.01); *G02F 1/13718* (2013.01)

(58) Field of Classification Search
CPC ............ G02F 1/1334; G02F 1/133601; G02F 1/13718
USPC ....................................... 349/74–81
See application file for complete search history.

(56) References Cited

U.S. PATENT DOCUMENTS

| | | | |
|---|---|---|---|
| 6,963,435 B2 | 11/2005 | Mallya et al. | |
| 2015/0378205 A1 | 12/2015 | Kim et al. | |
| 2018/0074356 A1* | 3/2018 | Okuyama | ............... G02F 1/163 |
| 2021/0048676 A1* | 2/2021 | Manly | ................ G02B 27/0172 |
| 2022/0365402 A1* | 11/2022 | Kurokawa | .......... G02F 1/13471 |

FOREIGN PATENT DOCUMENTS

| | | |
|---|---|---|
| CN | 1727916 A | 2/2006 |
| CN | 212781606 U | 3/2021 |
| CN | 112987379 A | 6/2021 |
| TW | 202215129 A | 4/2022 |

* cited by examiner

*Primary Examiner* — Charles S Chang
(74) *Attorney, Agent, or Firm* — MUNCY, GEISSLER, OLDS & LOWE, P.C.

(57) ABSTRACT

An electronic device includes a scattering structure, a dimming structure and a controller. The dimming structure is arranged on the scattering structure. The controller is electrically connected to the dimming structure. The controller includes a first control unit, and the first control unit is provided to adjust the transmittance of the dimming structure.

17 Claims, 16 Drawing Sheets

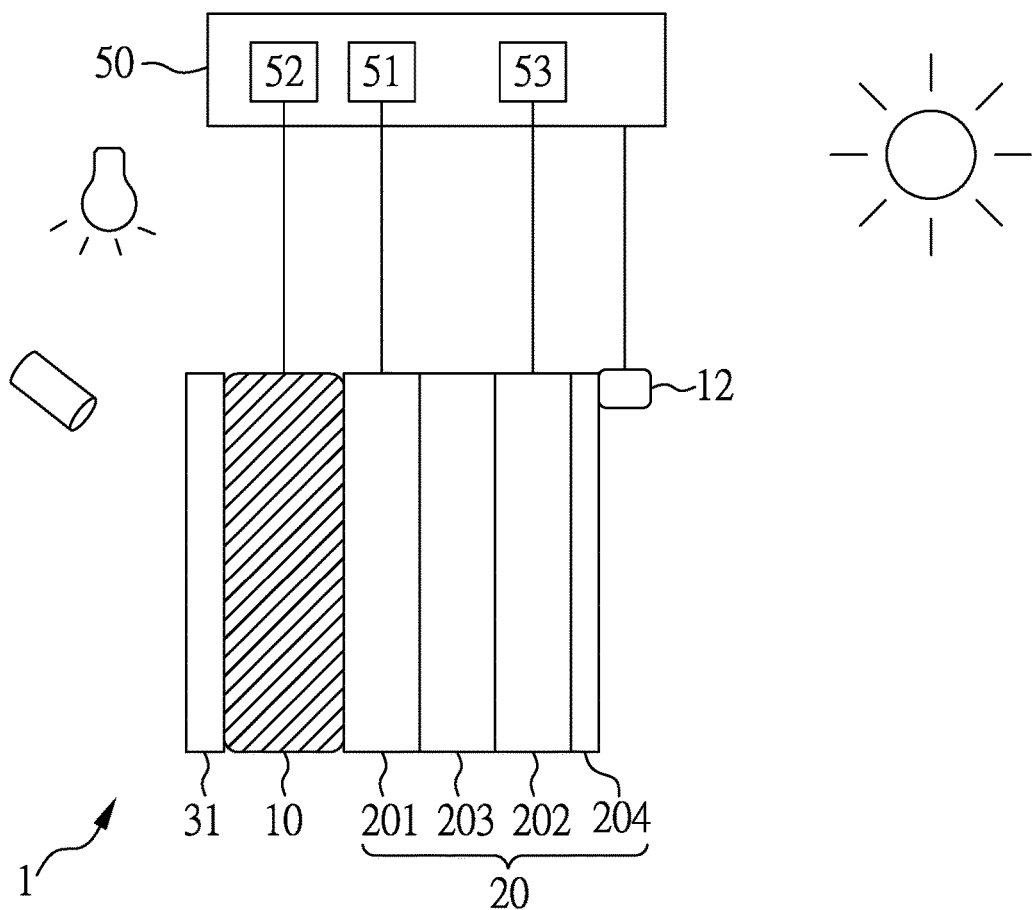

| mode | indoor observing | outdoor observing | liquid crystal structure | dye cell | liquid crystal direction |
|---|---|---|---|---|---|
| front projection | image | reflected ambient light or black screen | hazing state | dark state | first direction |
| front/rear projection | image | image | hazing state | bright state | second direction |
| dimming | outside | inside | transparent state | dark ~ bright state | second direction |

FIG. 11

| mode | indoor observing | outdoor observing | liquid crystal structure | liquid crystal direction |
|---|---|---|---|---|
| front projection | image | reflected ambient light or black screen | hazing state | first direction |
| front/rear projection | image | image | hazing state | second direction |
| dimming | outside | inside | transparent state | second direction |

ELECTRONIC DEVICE

CROSS-REFERENCE TO RELATED APPLICATIONS

This application claims the benefits of the Chinese Patent Application Serial Number 202310116444.0, filed on Feb. 15, 2023, and the Chinese Patent Application Serial Number 202310857766.0, filed on Jul. 13, 2023, the subject matters of which are incorporated herein by reference.

BACKGROUND

Field of the Disclosure

The present disclosure relates to an electronic device and, more specifically, to an electronic device providing the function of a smart window or a transparent display.

Description of Related Art

Smart windows are generally made of scattering cells. By adjusting the deflection degree of liquid crystal molecules, the windows may be converted into hazing state and transparent state, and thus the shading privacy and transparent lighting effects may be provided. However, when the smart window is used for projection, the quality of the visually projected image may be poor due to the interference of external ambient light, which cannot meet the actual needs.

In addition, the manufactured transparent display usually only achieves the effect of double-sided visible transparent display and cannot be switched to single-sided visible, and its ambient contrast ratio effect also needs to be improved.

Therefore, it is desired to provide an improved electronic device to mitigate and/or obviate the aforementioned problems.

SUMMARY

The present disclosure provides an electronic device, which comprises: a scattering structure; a dimming structure disposed on the scattering structure; and a controller including a first control unit electrically connected to the dimming structure for adjusting a transmittance of the dimming structure.

The present disclosure further provides an electronic device, which comprises: a scattering structure; and a first dimming structure disposed on the scattering structure; wherein a combination of the scattering structure and the first dimming structure has a transmittance of between 1% and 70%.

The present disclosure further provides an electronic device, which comprises: a scattering structure having a first side and a second side opposite to the first side; a first dimming structure disposed on the first side of the scattering structure; a second dimming structure disposed on the second side of the scattering structure; and a controller electrically connected to the first dimming structure and the second dimming structure for adjusting a transmittance of the first dimming structure and a transmittance of the second dimming structure.

The present disclosure further provides an electronic device, which comprises: a light emitting structure having a first side and a second side opposite to the first side; a first dimming structure disposed on the first side of the light emitting structure; a second dimming structure disposed on the second side of the light emitting structure; and a controller electrically connected to the first dimming structure and the second dimming structure for adjusting a transmittance of the first dimming structure and a transmittance of the second dimming structure.

Other novel features of the disclosure will become more apparent from the following detailed description when taken in conjunction with the accompanying drawings.

BRIEF DESCRIPTION OF DRAWINGS

FIG. 11 shows the electronic device according to an embodiment of the present disclosure;

DETAILED DESCRIPTION OF EMBODIMENT

Figure 1A:
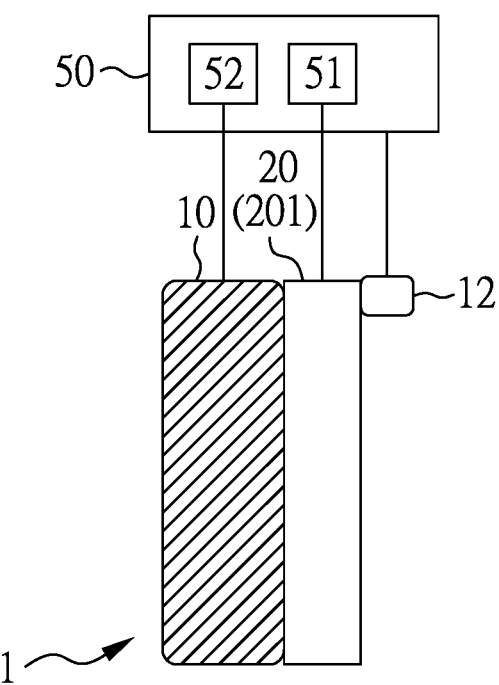
FIGS. 1A~1D are schematic diagrams showing the electronic device of the present disclosure with a two-cell architecture.

Different embodiments of the present disclosure are provided in the following description. These embodiments are meant to explain the technical content of the present disclosure, but not meant to limit the scope of the present disclosure. A feature described in an embodiment may be applied to other embodiments by suitable modification, substitution, combination, or separation.

It should be noted that, in the present specification, when a component is described to "comprise", "have", "include" an element, it means that the component may include one or more of the elements, and the component may include other elements at the same time, and it does not mean that the component has only one of the element, except otherwise specified.

Moreover, in the present specification, the ordinal numbers, such as "first" or "second", are only used to distinguish a plurality of elements having the same name, and it does not means that there is essentially a level, a rank, an executing order, or an manufacturing order among the elements, except otherwise specified. The ordinal numbers of the elements in the specification may not be the same in claims. For example, a "second" element in the specification may be a "first" element in the claims.

In the present specification, except otherwise specified, the feature A "or" or "and/or" the feature B means only the existence of the feature A, only the existence of the feature B, or the existence of both the features A and B. The feature A "and" the feature B means the existence of both the features A and B.

Moreover, in the present specification, the terms, such as "top", "upper", "bottom", "front", "back", or "middle", as well as the terms, such as "on", "above", "over", "under", "below", or "between", are used to describe the relative positions among a plurality of elements, and the described relative positions may be interpreted to include their translation, rotation, or reflection.

Furthermore, the terms recited in the specification and the claims such as "above ",", over", "on", "below", or "under" are intended that an element may not only directly contacts other element, but also indirectly contact the other element.

Furthermore, the term recited in the specification and the claims such as "connect" is intended that an element may not only directly connect to other element, but also indirectly connect to other element. On the other hand, the terms recited in the specification and the claims such as "electrically connect" and "couple" are intended that an element may not only directly electrically connect to other element, but also indirectly electrically connect to other element.

In the present specification, except otherwise specified, the terms (including technical and scientific terms) used herein have the meanings generally known by a person skilled in the art. It should be noted that, except otherwise specified in the embodiments of the present disclosure, these terms (for example, the terms defined in the generally used dictionary) should have the meanings identical to those skilled in the art, the background of the present disclosure or the context of the present specification, and should not be read by an ideal or over-formal way.

The electronic device of the present disclosure may include a display device, a backlight device, an antenna device, a sensing device or a tilted device, but not limited thereto. The electronic device may be a bendable or flexible electronic device. The display device may be a non-self-luminous display device or a self-luminous display device. The antenna device may be a liquid crystal type antenna device or a non-liquid crystal type antenna device, and the sensing device may be a sensing device for sensing capacitance, light, thermal energy or ultrasonic waves, but not limited thereto. The electronic components in the electronic device may include passive components and active components, such as capacitors, resistors, inductors, diodes, transistors, and the like. The diodes may include light emitting diodes or photodiodes. The light emitting diodes may, for example, include organic light emitting diodes (OLEDs), sub-millimeter light emitting diodes (mini LEDs), micro light emitting diodes (micro LEDs) or quantum dot light emitting diodes (quantum dot LEDs), but not limited thereto. The tiled device may be, for example, a tiled display device or a tiled antenna device, but not limited thereto. It should be noted that the electronic device may be any permutation and combination of the aforementioned, but not limited thereto. The content of the present disclosure will be described below with an electronic device.

Figure 1B:
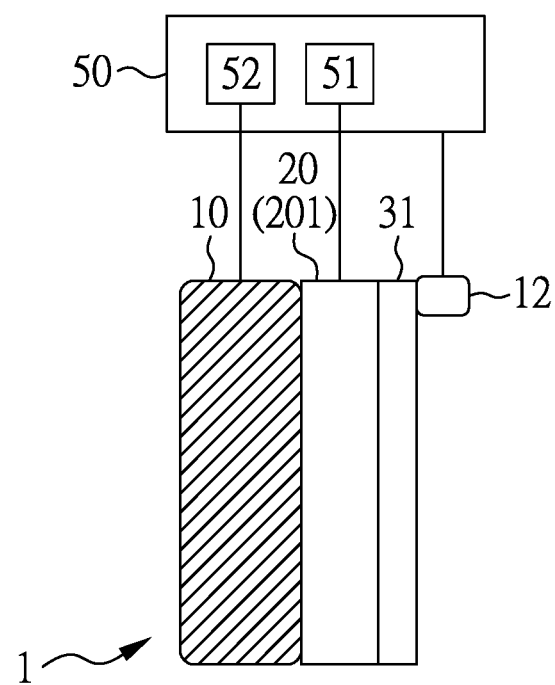
Figure 1C:
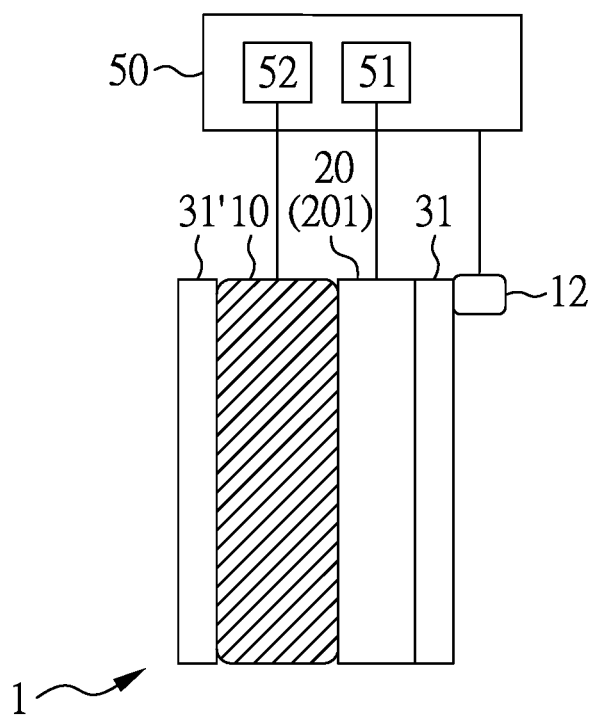
Figure 1D:
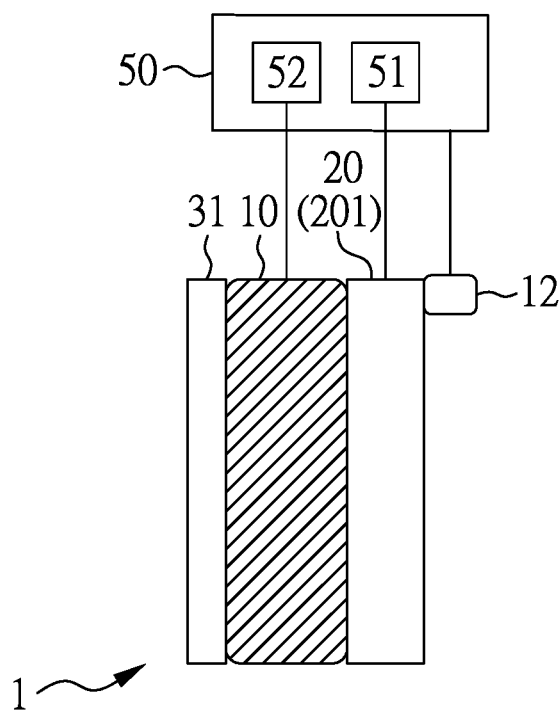
Figures 1E, 1F:
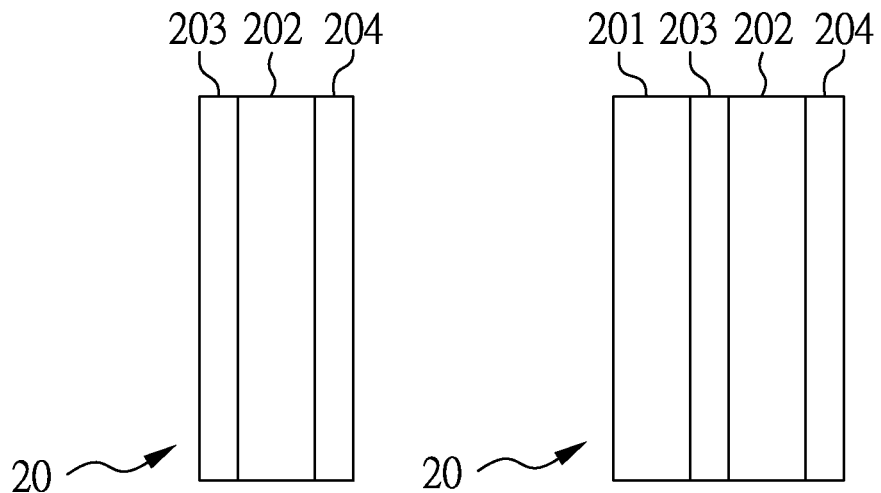
FIGS. 1E~1G are schematic diagrams showing implementation aspects of the dimming structure according to the present disclosure.
Figure 1G:
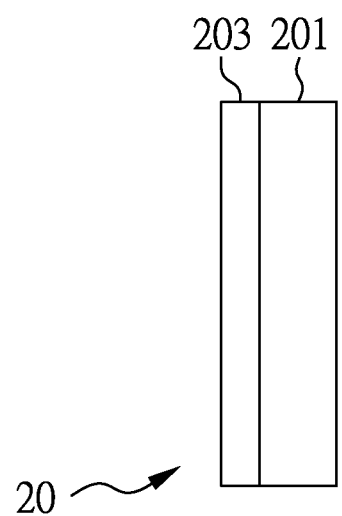

The electronic device of the present disclosure includes a plurality of liquid crystal layers to provide a smart window capable of providing projection, shading privacy and transparent lighting effects. FIGS. 1A~1D are schematic diagrams showing the electronic device 1 of the present disclosure with a two-cell architecture, and FIGS. 1E~1G are schematic diagrams showing implementation aspects of the dimming structure according to the present disclosure, wherein the dimming structure 20 in FIGS. 1E~1G can be applied to the dimming structure 20 in the electronic device 1 in FIGS. 1A~1D. As shown in FIG. 1A, the two-cell architecture includes a scattering structure 10 and a dimming structure 20 disposed on the scattering structure 10. In FIG. 1A, the scattering structure 10 may be a scattering cell, and its liquid crystal type may be, for example, PDLC (polymer dispersed liquid crystal), PSCT (polymer stabilized cholesteric texture), PNLC (polymer network liquid crystal), CLC (cholesteric liquid crystal), etc., but it is not limited thereto. The dimming structure 20 may include liquid crystal cells, dichroic dyes, optical films, or other suitable materials or a combination thereof. In FIGS. 1A~1D. The dimming structure 20 may be, for example, a dye cell 201 formed by distributing dichroic dyes in the liquid crystal, wherein the liquid crystal type of the dye cell 201 may be, for example, TN (twisted nematic), RSTN (reversed super twisted nematic), STN (super twisted nematic), ECB (electrically controlled birefringence), VA-ECB (vertical alignment electrically controlled birefringence), etc., but it is not limited thereto. In FIGS. 1E~1G, the dimming structure 20 may be, for example, a combination of an optical film and a liquid crystal cell. In the present disclosure, the electronic device 1 further includes a controller 50 electrically connected to the scattering structure 10 and the dimming structure 20 for adjusting the haze of the scattering structure 10 and the transmittance of the dimming structure 20. For example, the controller 50 includes a first control unit 51 and a second control unit 52. The first control unit 51 is electrically connected to the dimming structure 20 to adjust the transmittance of the dimming structure 20. The second control unit 52 is electrically connected to the scattering structure 10 to adjust the haze of the scattering structure 10. The transmittance in the present disclosure refers to the transmittance of visible light, which will not be described in detail below. In some embodiments, the electronic device 1 may optionally include a light sensing unit 12, the light sensing unit 12 is electrically connected to the controller 50 for detecting ambient light and transmitting the ambient light signal to the first control unit 51, so that the dimming structure 20 may automatically adjust the transmittance based on changes in ambient light, but the present disclosure is not limited thereto. The light sensing unit 12 may be disposed on the side of the dimming structure 20 away from the scattering structure 10, integrated in the dimming structure 20, or at other positions capable of detecting ambient light, but it is not limited thereto. In FIG. 1B, its architecture is similar to that of FIG. 1A, but it further includes an anti-reflection film 31 disposed on the side of the dimming structure 20 away from the scattering structure 10 to further reduce images with lower visual effects caused by the reflection of ambient light. In FIG. 1C, its architecture is similar to that of FIG. 1B, but it further includes another anti-reflection film 31' disposed on the side of the scattering structure 10 away from the dimming structure 20. In FIG. 1D, its architecture is similar to that of FIG. 1A, but it further includes an anti-reflection film 31 disposed on the side of the scattering structure 10 away from the dimming structure 20. The aforementioned anti-reflection films 31, 31' are, for example, AGAR (Anti-Glare Anti-Reflection) coatings, while this is only an example but not a limitation.

FIG. 1E shows an implementation aspect of the dimming structure 20, which includes a liquid crystal cell 202, and a first optical film 203 and a second optical film 204. The first optical film 203 and the second optical film 204 are respectively arranged on opposite sides of the liquid crystal cell 202, wherein the liquid crystal type of the liquid crystal cell 202 is, for example, VA (vertical alignment), IPS (in plane switch), TN (twisted nematic), RSTN (reversed super twisted nematic), STN (super twisted nematic), ECB (electrically controlled birefringence), VA-ECB (vertical alignment electrically controlled birefringence), etc., but it is not limited thereto. The optical film includes a DBEF (dual brightness enhancement film), a polarizer, other suitable film layers, or a combination thereof. For example, the first optical film 203 may be a DBEF, and the second optical film 204 may be a polarizer. In some embodiments, both the first optical film 203 and the second optical film 204 are polarizers, but it is not limited thereto. FIG. 1F shows an implementation aspect of the dimming structure 20, which is similar to the implementation aspect of FIG. 1E, but further includes a dye cell 201 disposed on the surface of the first optical film 203 away from the liquid crystal cell 202. FIG. 1G shows an implementation aspect of the dimming structure 20, which includes a dye cell 201 and a first optical film 203 disposed on one side of the dye cell 201, wherein the first optical film 203 may be a DBEF or polarizer.

Figure 2A:
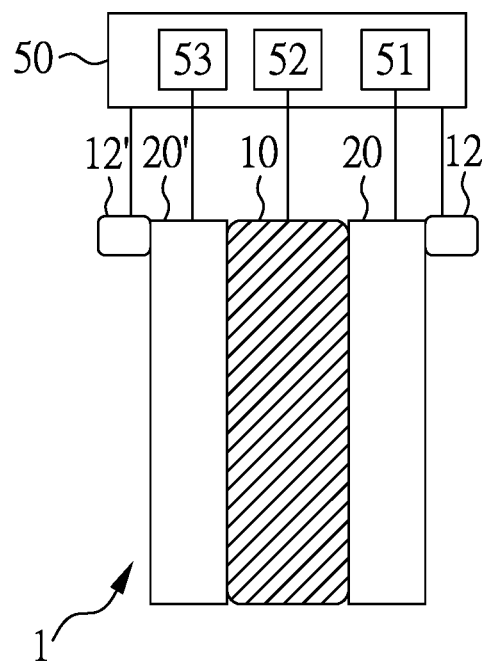
FIGS. 2A~2C are schematic diagrams showing the electronic device of the present disclosure with three-cell architecture.
Figure 2B:
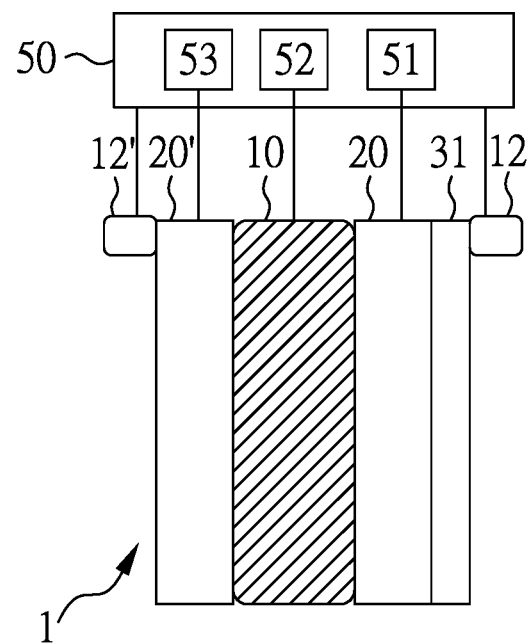
Figure 2C:
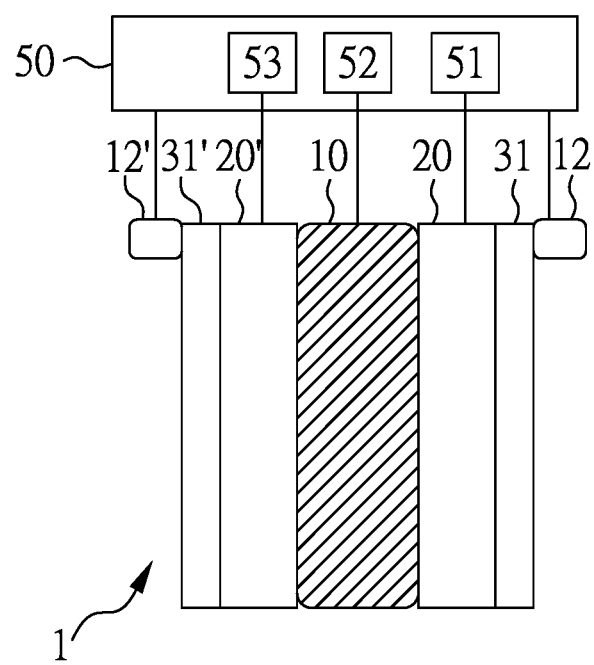

FIGS. 2A~2C are schematic diagrams showing the electronic device 1 of the present disclosure with three-cell architecture. As shown in FIG. 2A, the three-cell architecture includes a scattering structure 10, and a first dimming structure 20 and a second dimming structure 20', wherein the first dimming structure 20 and the second dimming structure 20' are respectively arranged on opposite sides of the scattering structure 10. That is, the second dimming structure 20' and the first dimming structure 20 are arranged correspondingly, so that the scattering structure 10 is arranged between the first dimming structure 20 and the second dimming structure 20'. In FIG. 2A, the scattering structure 10 is, for example, a scattering cell, and the first dimming structure 20 and the second dimming structure 20' include liquid crystal cells, dichroic dyes, optical films, or other suitable materials or a combination thereof. In the present disclosure, the electronic device 1 further includes a controller 50 electrically connected to the scattering structure 10, the first dimming structure 20 and the second dimming structure 20' for adjusting the haze of the scattering structure 10 and the transmittance of the first dimming structure 20 and the second dimming structure 20'. For example, the controller 50 includes a first control unit 51, a second control unit 52 and a third control unit 53. The first control unit 51 is electrically connected to the first dimming structure 20 for adjusting the transmittance of the first dimming structure 20. The second control unit 52 is electrically connected to the scattering structure 10 to adjust the haze of the scattering structure 10. The third control unit 53 is electrically connected to the second dimming structure 20' to adjust the transmittance of the second dimming structure 20'. In some embodiments, the electronic device 1 may further include a first light sensing unit 12 electrically connected to the controller 50 for detecting ambient light and transmitting ambient light signal to the first control unit 51 and the third control unit 53 for automatically adjust the transmittance of the first dimming structure 20 and the second dimming structure 20' synchronously, but the present disclosure is not limited thereto. In some embodiments, the electronic device 1 may further include a first light sensing unit 12 and a second light sensing unit 12' electrically connected to the controller 50 for individually detecting ambient light and transmitting the ambient light signal to the first control unit 51 and the third control unit 53 so as to individually adjust the transmittance of the first dimming structure 20 and the second dimming structure 20', but the present disclosure is not limited thereto. The first light sensing unit 12 may be arranged, for example, on the side of the first dimming structure 20 away from the scattering structure 10, integrated in the first dimming structure 20, or other positions that can detect ambient light. The second light sensing unit 12' may be arranged, for example, on the side of the second dimming structure 20' away from the scattering structure 10, integrated in the second dimming structure 20', or other positions that can detect ambient light, but it is not limited thereto. In FIG. 2B, its architecture is similar to that of FIG. 2A, but it further includes an anti-reflection film 31 disposed on the side of the first dimming structure 20 away from the scattering structure 10, and the first light sensing unit 12 is disposed on the side of the anti-reflection film 31 away from the first dimming structure 20. In FIG. 2C, its architecture is similar to that in FIG. 2B, but it further includes another anti-reflection film 31' disposed on the side of the second dimming structure 20' away from the scattering structure 10, and the second light sensing unit 12' is disposed on the side of another anti-reflection film 31' away from the second dimming structure 20'. The aforementioned anti-reflection films 31, 31' are, for example, AGAR coatings, while this is only an example but not a limitation.

Figure 3:
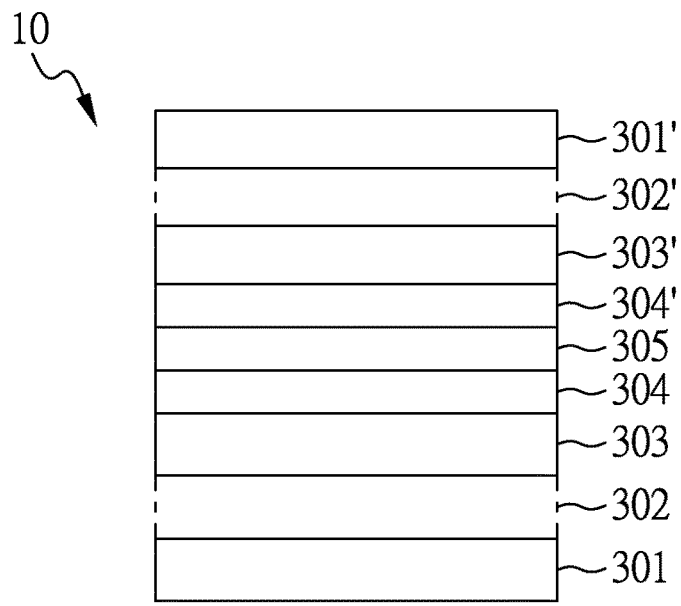
FIG. 3 is a schematic diagram showing the scattering structure of the electronic device according to the present disclosure.

FIG. 3 is a schematic diagram showing the scattering structure 10 of the electronic device 1 according to the present disclosure. As shown, the scattering structure 10 includes a first substrate 301 and a second substrate 301', a first conductive layer 303 and a second conductive layer 303' respectively disposed on the first substrate 301 and the second substrate 301', a first alignment layer 304 and a second alignment layer 304' respectively disposed on the first conductive layer 303 and the second conductive layer 303', and a liquid crystal layer 305 disposed between the first substrate 301 and the second substrate 301', or further disposed between the first alignment layer 304 and the second alignment layer 304', wherein the material of the first conductive layer 303 and the second conductive layer 303' is, for example, indium tin oxide (ITO), and the first substrate 301 and the second substrate 301' are, for example, glass substrates, while this is only an example but not a limitation. In addition, in order to reduce the mirror reflectivity (R %) of the scattering structure 10, optionally, in the stack structure of the scattering structure 10, a first intermediate layer 302 and a second intermediate layer 302' may be respectively added between the first conductive layer 303 and the first substrate 301 and between the second conductive layer 303' and the second substrate 301'; that is, the first conductive layer 303 is disposed on the first substrate 301, and the first intermediate layer 302 is disposed between the first substrate 301 and the first conductive layer 303. The first intermediate layer 302 (second intermediate layer 302')

is a refractive index matching layer, and its refractive index is between the refractive index of the first substrate 301 and the refractive index of the first conductive layer 303, for example, the refractive index is 1.5~2.2, so as to reduce the interface reflection between layers thereby improving the transmittance. Moreover, the material of the first intermediate layer 302 (second intermediate layer 302') may be $Al_2O_3$, ZnO and other materials, while this is only an example but not a limitation.

Figure 4A:
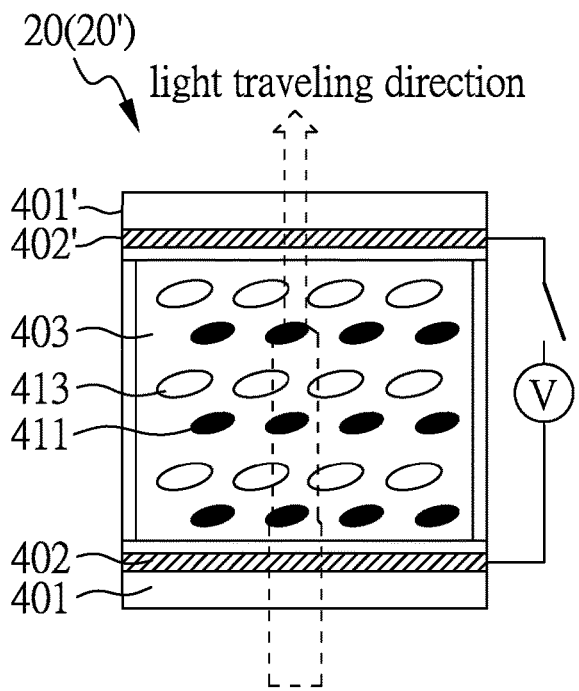
FIGS. 4A and 4B are schematic diagrams showing the dimming structure of the electronic device according to the present disclosure.
Figure 4B:
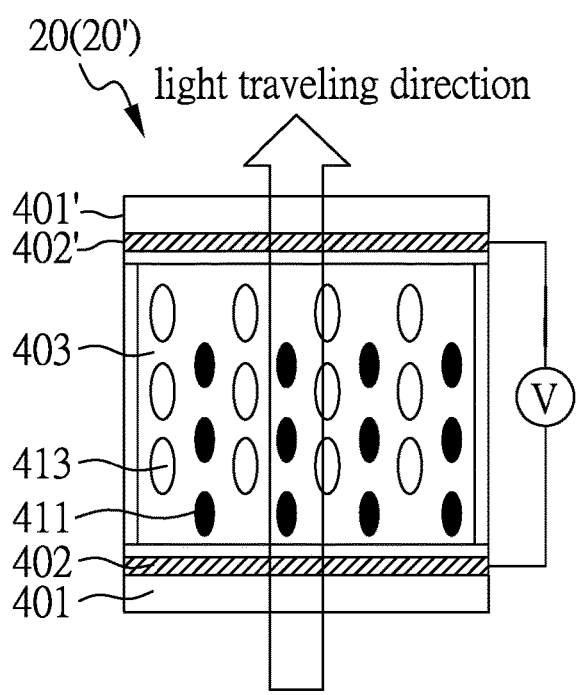

FIGS. 4A and 4B are schematic diagrams showing the dimming structure 20 (20') of the electronic device 1 according to the present disclosure. The dimming structure 20 includes a first substrate 401 and a second substrate 401', a first conductive layer 402 and a second conductive layer 402' respectively disposed on the first substrate 401 and the second substrate 401', and a liquid crystal layer 403 disposed between the first substrate 401 and the second substrate 401', or further disposed between the first conductive layer 402 and the second conductive layer 402', wherein the liquid crystal layer 403 of the dimming structure 20 includes dichroic dyes 411 and liquid crystal molecules 413. As shown in FIG. 4A, when no voltage is applied between the first conductive layer 402 and the second conductive layer 402', the long-axis alignment direction of the dichroic dyes 411 and the liquid crystal molecules 413 is substantially perpendicular to the light traveling direction, so that most of the light is absorbed by the dichroic dyes, and thus the dimming structure 20 is in a dark state. As shown in FIG. 4B, when a specific voltage is applied between the first conductive layer 402 and the second conductive layer 402', the long-axis alignment direction of the dichroic dyes 411 and the liquid crystal molecules 413 is substantially parallel to the light traveling direction, thereby reducing the light absorbed by the dichroic dyes, so that the dimming structure 20 is in a bright state. Therefore, the transmittance of the dimming structure 20 may be adjusted through voltage control. In some embodiments, when a voltage is applied between the first conductive layer 402 and the second conductive layer 402', the long-axis alignment direction of the dichroic dyes 411 and the liquid crystal molecules 413 is substantially perpendicular to the light traveling direction so that the dimming structure 20 is in the dark state and, when no voltage is applied between the first conductive layer 402 and the second conductive layer 402', the long-axis alignment direction of the dichroic dyes 411 and the liquid crystal molecules 413 is substantially parallel to the light traveling direction so that the dimming structure 20 is in a bright state. The transmittance of the dimming structure 20 (20') may be adjusted to be approximately between 1% and 70%. Therefore, in the aforementioned two-cell architecture, the transmittance of the combination of the scattering structure 10 and the first dimming structure 20 is between 1% and 70% and, in the aforementioned three-cell architecture, the transmittance of the combination of the first dimming structure 20, the scattering structure 10 and the second dimming structure 20' is approximately between 0.01% and 60%.

Figure 5:
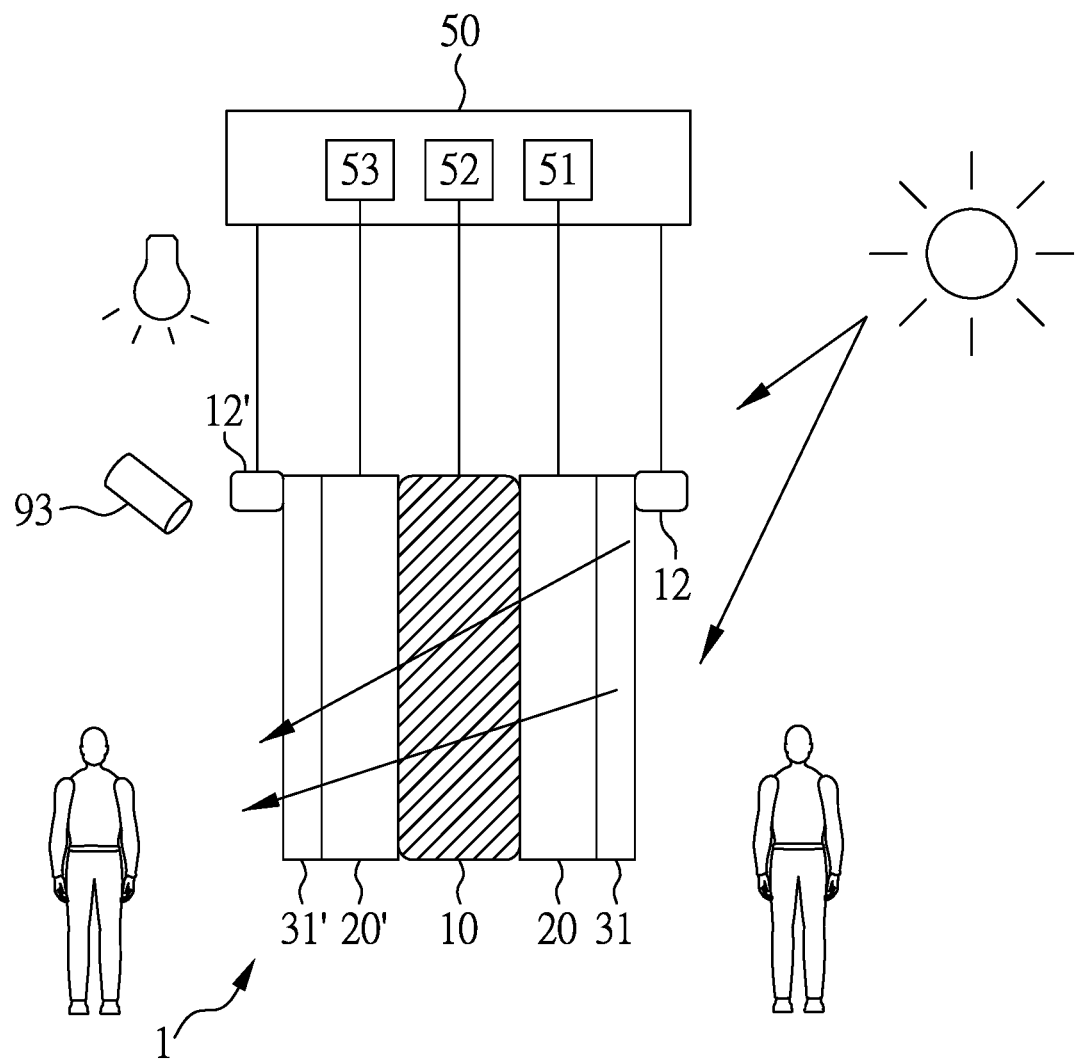
FIG. 5 shows the electronic device according to an embodiment of the present disclosure.

FIG. 5 shows the electronic device 1 according to an embodiment of the present disclosure. As shown, by taking the three-cell architecture shown in FIG. 2C as an example, the electronic device 1 of this embodiment illustrates the dimming mode (light transmitting mode) of the electronic device 1. In FIG. 5, a controller 50 is used to control the electronic device 1, and the controller 50 includes a first control unit 51, a second control unit 52 and a third control unit 53. The first control unit 51 and the third control unit 53 are electrically connected to the first dimming structure 20 and the second dimming structure 20', respectively, to adjust the transmittance of the first dimming structure 20 and the second dimming structure 20', and the second control unit 52 is electrically connected to the scattering structure 10 for adjusting the haze value of the scattering structure 10. In this embodiment, the electronic device 1 further includes a first light sensing unit 12 and a second light sensing unit 12', and the first light sensing unit 12 and the second light sensing unit 12' are electrically connected to the controller 50 for individually detecting ambient light (such as sunlight, lamplight, etc.), and individually transmitting ambient light signal to the first control unit 51 and the third control unit 53, so that the transmittance of the first dimming structure 20 and the second dimming structure 20' may be automatically adjusted based on ambient light changes. In some embodiments, the electronic device 1 only includes the first sensing unit 12, and the first control unit 51 and the third control unit 53 may synchronously adjust the first transmittance of the first dimming structure 20 and the second dimming structure 20' according to the ambient light detected by the first light sensing unit 12. For example, in the automatic dimming (light transmitting) mode, the first light sensing unit 12 on the outdoor side of the electronic device 1 is used to sense the external ambient light and transmit the ambient light signal to the first control unit 51 and the third control unit 53, so that the first control unit 51 and the third control unit 53 may adjust the transmittance of the first dimming structure 20 and the second dimming structure 20' according to the ambient light detected by the first light sensing unit 12. In the light transmitting mode, by correspondingly adjusting the liquid crystal deflection degree of the three-cell architecture, the scattering structure 10 is made to appear in a transparent state (for example, the transmittance is greater than 90% or the haze is smaller than 5%), and the transmittance of the combination of the first dimming structure 20, the scattering structure 10 and the second dimming structure 20' is approximately between 0.01% and 60%, so as to achieve the effect of light transmitting. For example, in the light transmitting mode, when the ambient light illuminance is sensed by the second light sensing unit 12' as 10,000 lumens (lux), the transmittance is adjusted to be 10% if the indoor illuminance needs to be maintained at 1,000 lux, and the transmittance is adjusted to be 50% if the ambient light is 2000 lux. In this embodiment, the electronic device 1 further includes an anti-reflection film 31 and an anti-reflection film 31', which are respectively disposed on the side of the dimming structure 20 away from the scattering structure 10 and the side of the dimming structure 20' away from the scattering structure 10, so as to further reduce the images with low visual effect caused by the reflection of ambient light.

In addition, if the electronic device 1 is in the manual dimming mode, the first light sensing unit 12 and the second light sensing unit 12' may not be activated, and the user may directly manually operate the controller 50 to adjust the first dimming structure 20, the second dimming structure 20' and the scattering structure 10 to meet the above usage situations. Furthermore, although the embodiment of FIG. 5 is illustrated by taking the three-cell architecture shown in FIG. 2C as an example, for other three-cell architectures (as shown in FIG. 2A and FIG. 2B) or two-cell architectures (as shown in FIGS. 1A~1D), those skilled in the art may achieve the effect of the same usage situation in a similar manner according to the aforementioned illustration, and thus a detailed description is deemed unnecessary.

Figure 6:
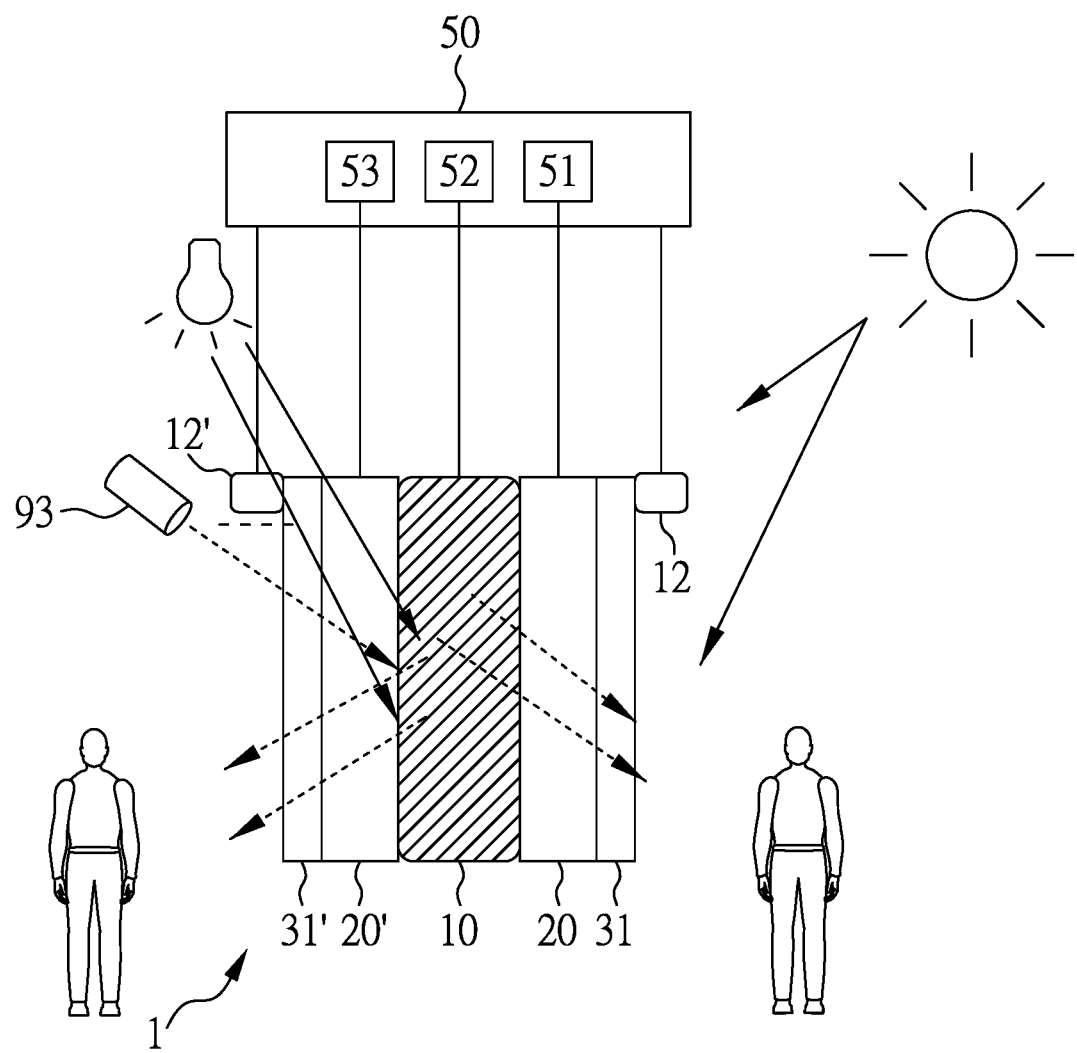
FIG. 6 shows the electronic device according to an embodiment of the present disclosure.

FIG. 6 shows an embodiment of the electronic device 1 according to the present disclosure. As shown, the electronic device 1 of this embodiment is the same as that of FIG. 5, and thus the details are not repeated here. This embodiment is different from FIG. 5 in the way of adjusting the electronic device to achieve the double-sided projection (full projection/semi-transparent projection) mode of the electronic device 1. When the usage situation is only required to project advertisement for viewing on both sides of the electronic device 1 (for example, a bus stop or a high-floor window in a department store), the full projection mode can be adopted. In this mode, the scattering structure 10 appears in a hazing state (for example, the haze is greater than 90%), and the first light sensing unit 12 and the second light sensing unit 12' are used to respectively receive outdoor and indoor ambient light. As the ambient light changes, the first control unit 51 and the third control unit 53 respectively control the first dimming structure 20 and the second dimming structure 20' to reduce the transmittance of the dimming structure (or increase the absorption rate of the dimming structure) so as to reduce the reflectivity of the electronic device 1 to ambient light. For example, the reflectivity of ambient light is approximately 2%~6%, which may reduce the influence of indoor and outdoor ambient light on indoor and outdoor observers, so as to improve the effect of ambient contrast ratio (ACR).

When the usage situation needs to be transparent and allows projection (for example, a medical diagnosis board or a projection glass on the first floor of a building), a semi-transparent projection mode may be adopted. In this mode, the scattering structure 10 is controlled by the second control unit 52 controls to be hazing state (for example, the haze is approximately 8% to 10%), and the first light sensing unit 12 and the second light sensing unit 12' are used to respectively receive the outdoor and indoor ambient light. As the ambient light changes, the first control unit 51 controls the first dimming structure 20 and the second dimming structure 20' respectively to reduce the transmittance of the dimming structure (or increase the absorption rate of the dimming structure) so as to reduce the reflectivity of the electronic device 1 to ambient light. For example, the reflectivity of ambient light is made to be approximately 2%~6%, which may reduce the influence of indoor and outdoor ambient light on indoor and outdoor observers to improve the effect of the ambient contrast ratio (ACR).

Although the embodiment of FIG. 6 is illustrated by taking the three-cell architecture shown in FIG. 2C as an example, for other three-cell architectures (as shown in FIG. 2A and FIG. 2B) or two-cell architecture (as shown in FIGS. 1A~1D), those skilled in the art may achieve the effect of the same usage situation in a similar manner according to the aforementioned illustration, and thus a detailed description is deemed unnecessary.

Figure 7:
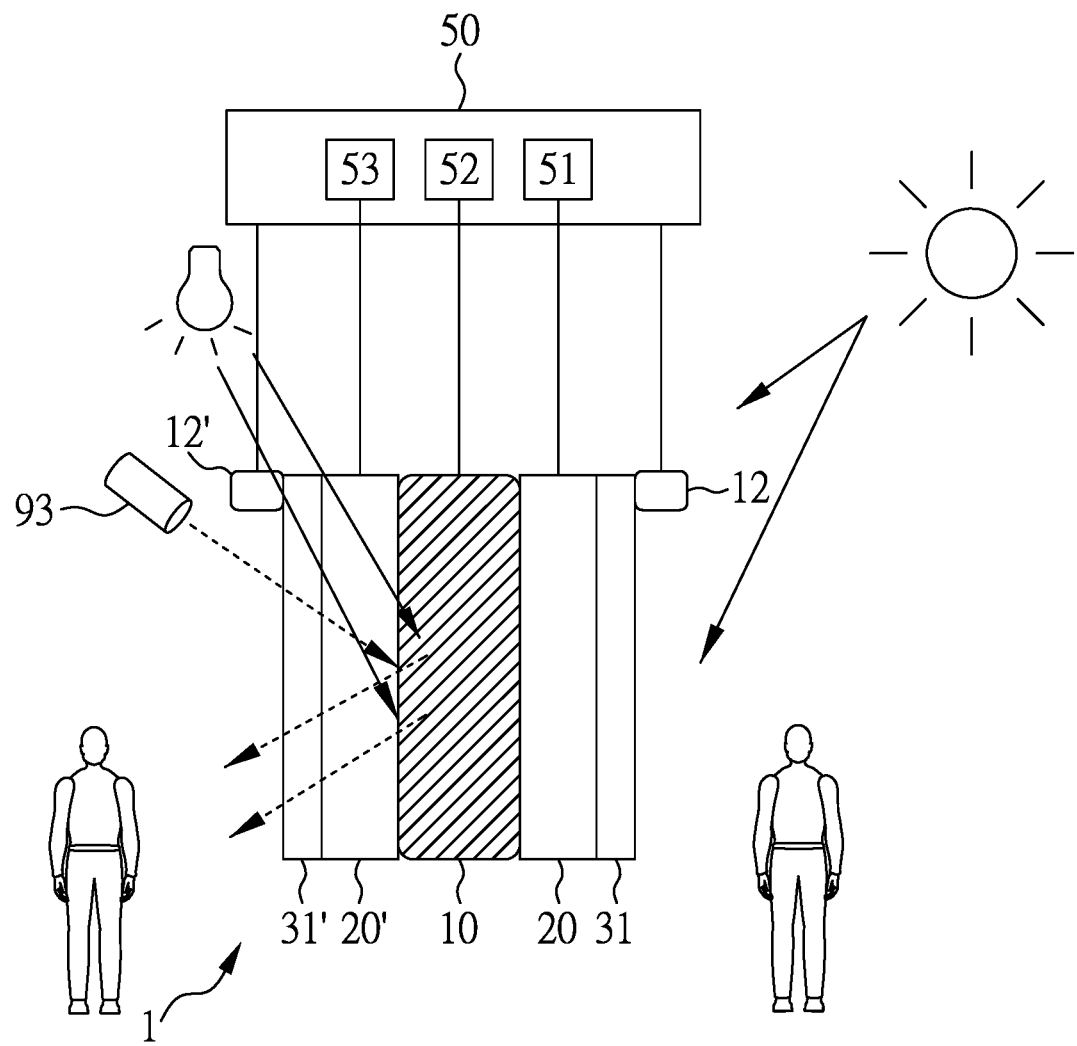
FIG. 7 shows the electronic device according to an embodiment of the present disclosure.

FIG. 7 shows the electronic device 1 according to an embodiment of the present disclosure. As shown, the electronic device 1 of this embodiment is the same as that of FIG. 5, and thus the details are not repeated here. This embodiment is different from FIG. 5 in the way of adjusting the electronic device to achieve the front projection mode of the electronic device 1 (that is, the mode that the observer can see the projected image when the projector 93 and the observer are on the same side of the electronic device 1). In this embodiment, the first light sensing unit 12 of the electronic device 1 may not be activated, and the first control unit 51 is used to adjust the transmittance of the first dimming structure according to the ambient light detected by the second light sensing unit 12', and the second dimming structure 20' is adjusted to a dark state. The second control unit 52 is electrically connected to the scattering structure 10 to adjust the haze value of the scattering structure 10. In the front projection mode suitable for the situation for projection on the window of a meeting room, the scattering structure 10 is controlled by the second control unit 52 to be full hazing (for example, the haze is greater than 90%). In some embodiments, in order to simultaneously avoid privacy leakage in the front projection mode, the transmittance of the first dimming structure 20 and the transmittance of the second dimming structure 20' may be further adjusted, so that the second dimming structure 20' outdoors is adjusted to a dark state (for example, the transmittance is smaller than 30%), and the transmittance of the first dimming structure 20 indoors is greater than the transmittance of the second dimming structure 20' outdoors. Therefore, the observer on the same side with the projector 93 may see the projection, and the scattering information caused by the projection may be greatly absorbed by the second dimming structure 20' to greatly reduce penetration, thereby achieving the effect of avoiding privacy leakage. Furthermore, on the indoor side, by sensing the ambient light through the second light sensing unit 12' and using the anti-reflection film 31', the reflectivity may be reduced so that the reflectivity of the ambient light is approximately 2%~6% thereby improving the ambient contrast ratio for the indoor observer. Furthermore, although the embodiment of FIG. 7 is illustrated by taking the three-cell architecture shown in FIG. 2C as an example, for other three-cell architectures (as shown in FIG. 2A and FIG. 2B) or two-cell architectures (as shown in FIGS. 1A~1D), those skilled in the art may achieve the effect of the same usage situation in a similar manner according to the aforementioned illustration, and thus a detailed explanation is deemed unnecessary.

Figure 8:
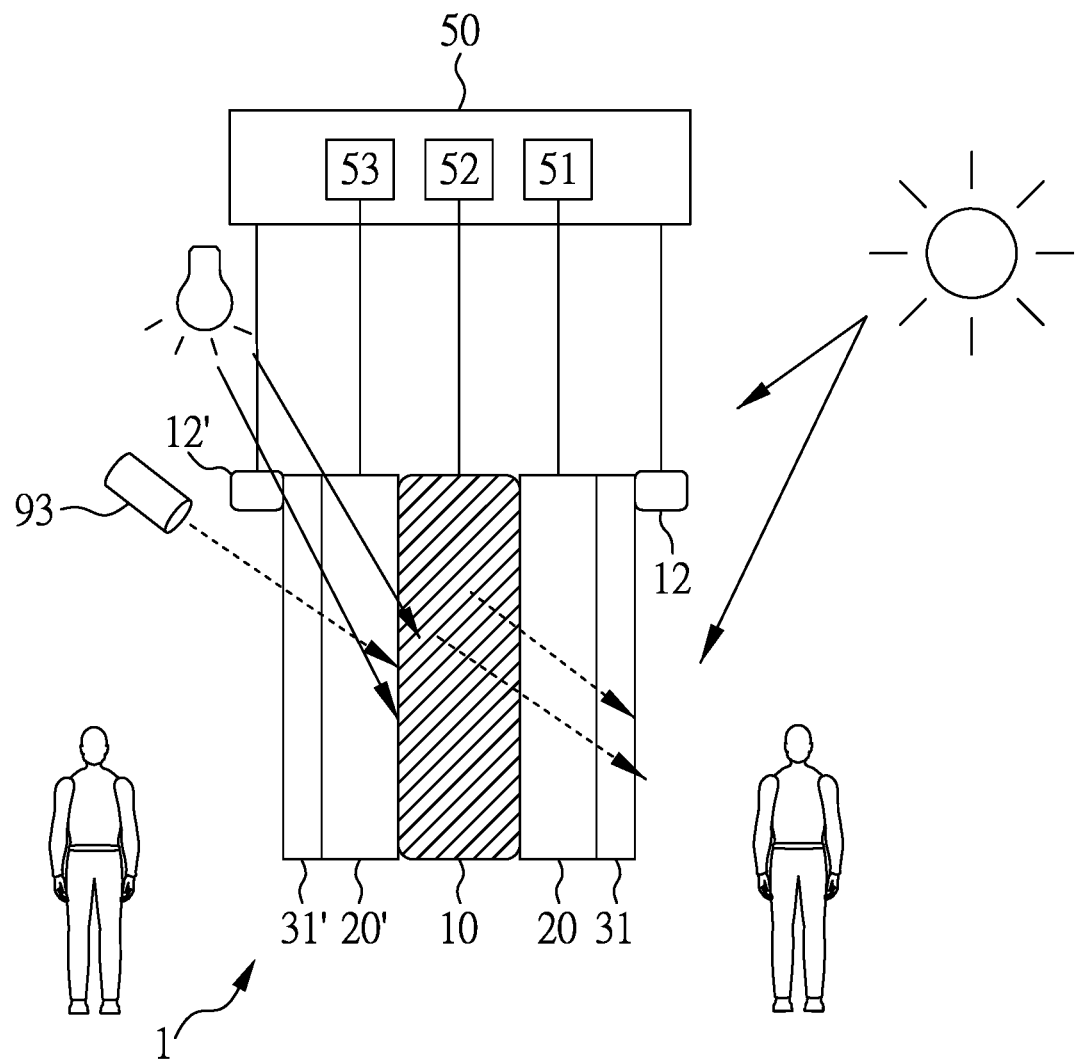
FIG. 8 shows the electronic device according to an embodiment of the present disclosure.

FIG. 8 shows an embodiment of an electronic device 1 according to the present disclosure. As shown, the electronic device 1 of this embodiment is the same as that of FIG. 5, and thus the details are not repeated here. This embodiment is different from FIG. 5 in the way of adjusting the electronic device 1 to achieve the rear projection mode of the electronic device 1 (that is, the mode that the observer can see the projected image when the projector 93 and the observer are on the opposite side of the electronic device 1). In this embodiment, the second light sensing unit 12 of the electronic device 1 may not be activated, and the first light sensing unit 12 is electrically connected to the controller 50 to detect ambient light and transmit the ambient light signal to the first control unit 51 and the third control unit 53, so that the first dimming structure 20 may adjust the transmittance according to the detected ambient light, and the second dimming structure 20' is adjusted to a bright state. In the rear projection mode suitable for the usage situation for the building advertisements, since there is no need for viewing indoors, it is not necessary to optimize the reflection reduction of ambient light indoors, so that only the first light sensing unit 12 outdoors is activated to detect the outdoor ambient light for adjusting and reducing the reflectivity, and the reflectivity of the ambient light is approximately 2%~6%, thereby improving the ambient contrast ratio for the outdoor observer. Furthermore, in order not to affect the signal light of the projector 93, the second dimming structure 20' indoors is adjusted to a bright state (for example, the transmittance>70%). In addition, although the embodiment of FIG. 8 is illustrated by taking the three-cell architecture shown in FIG. 2C as an example, for other three-cell architectures (as shown in FIG. 2A and FIG. 2B) or two-cell architectures (as shown in FIGS. 1A~1D), those skilled in the art may achieve the effect of the same usage situation in a similar manner according to the aforementioned illustration, and thus a detailed description is deemed unnecessary.

Figure 9:
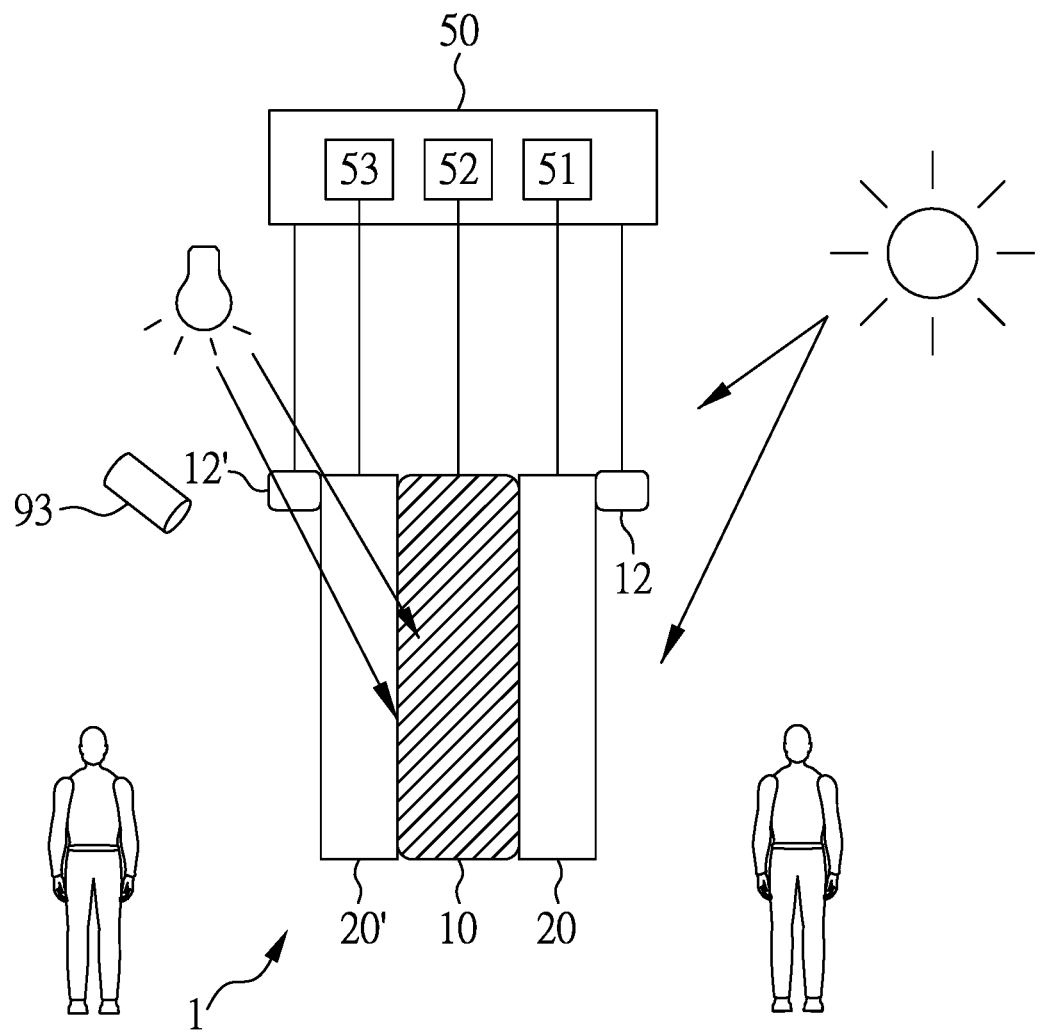
FIG. 9 shows the electronic device according to an embodiment of the present disclosure.

FIG. 9 shows the electronic device 1 according to an embodiment of the present disclosure. As shown, the electronic device 1 of this embodiment is the same as that of FIG. 5, so that the details are not repeated here. This embodiment is different from FIG. 5 in the manner of adjusting the electronic device 1 to achieve the privacy mode of the electronic device 1. In this embodiment, the first light sensing unit 12 and the second light sensing unit 12' of the electronic device 1 may not be activated. In this embodiment, the first dimming structure 20 and the second dimming structure 20' are adjusted to a dark state. In this privacy mode, the scattering structure 10 is adjusted to a full hazing (for example, the haze is greater than 90%), and the first dimming structure 20 and the second dimming structure 20' are adjusted to a dark state (for example, the transmittance is smaller than 30%), thereby making the whole appear in a black hazing state. Moreover, although the embodiment of FIG. 9 is illustrated by taking the three-cell architecture shown in FIG. 2A as an example, for other three-cell architectures (as shown in FIG. 2B and FIG. 2C) or two-cell architectures (as shown in FIGS. 1A~1D), those skilled in the art may achieve the effect of the same usage situation in a similar manner according to the aforementioned illustration, and thus a detailed description is deemed unnecessary.

Figure 10:
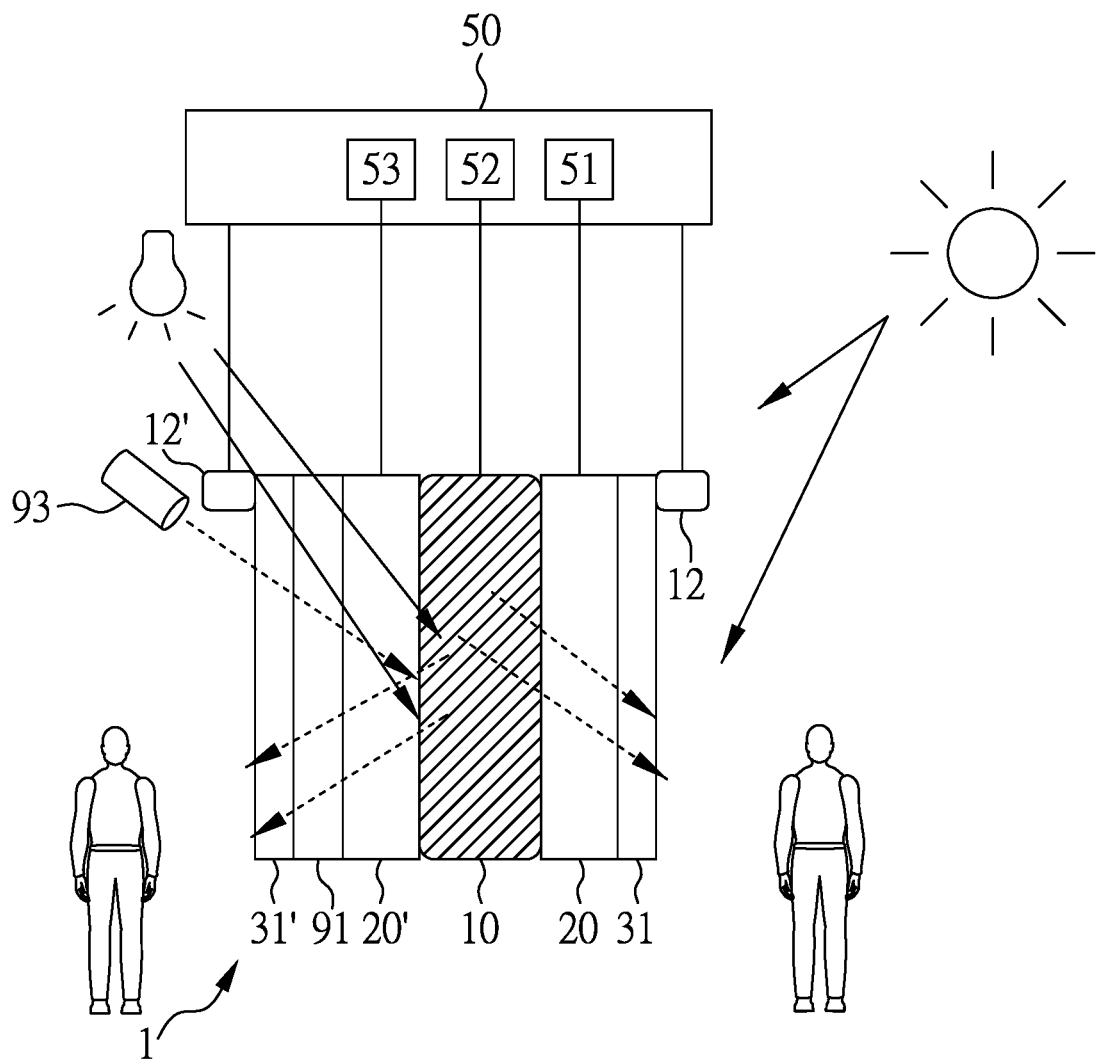
FIG. 10 shows the electronic device according to an embodiment of the present disclosure.

FIG. 10 shows the electronic device 1 according to an embodiment of the present disclosure. As shown, this embodiment is illustrated by taking the three-cell architecture shown in FIG. 2C as an example, wherein the electronic device 1 of this embodiment is similar to that of FIG. 6, except that it further includes an optical film 91 (such as a polarizer) disposed between the second dimming structure 20' and the anti-reflection film 31'. That is, the optical film 91 is disposed on one side of the second dimming structure 20' indoors. Therefore, when the projector 93 used is such a projector that emits a polarized signal light source (for example, a 3LCD projector), in the projection mode, the optical film 91 may cut off indoor ambient light without influencing the signal light source, so as to provide improved ambient contrast ratio. Furthermore, although the embodiment of FIG. 10 is illustrated by taking the three-ell architecture shown in FIG. 2C as an example, for other three-cell architectures (as shown in FIG. 2A and FIG. 2B) or two-cell architectures (as shown in FIGS. 1A~1D), those skilled in the art may achieve the same effect in a similar manner according to the aforementioned illustration, and thus a detailed description is deemed unnecessary.

Moreover, the present disclosure may combine the dimming structure 20 as shown in FIGS. 1E~1G with the scattering structure 10, and make use of the stack design and the control of the scattering structure 10 and the dimming structure 20 to select whether it is possible to allow indoor or outdoor observers to watch images. That is, by controlling the scattering structure 10 and the dimming structure 20 to achieve front projection mode, front/rear projection mode, privacy mode, dimming mode, light transmitting mode, etc. For example, the dimming structure 20 shown in FIGS. 1E-1G may further include a liquid crystal cell 202, and a first optical film 203 and a second optical film 204. The liquid crystal cell 202 has the liquid crystal molecules with an adjustable deflection degree, and the first absorption axes of the optical film 203 and the second optical film 204 may be perpendicular or parallel to each other. Therefore, by adjusting the direction of the liquid crystal molecules of the liquid crystal cell 202 to change from the first direction to the second direction or from the second direction to the first direction (where the first direction is defined as the long axis of the liquid crystal molecule being rotated from the axial direction of the first optical film 203 to the axial direction of the second optical film 204, or being rotated from the axial direction of the second optical film 204 to the axial direction of the first optical film 203, and the second direction is defined as the direction of the long axis of the liquid crystal molecule being parallel to the light traveling direction), so as to control whether the light can pass through the dimming structure 20. In addition, by adjusting the liquid crystal molecules of the scattering structure 10, it is able to achieve various modes of the electronic device 1.

FIG. 11 shows the electronic device 1 according to an embodiment of the present disclosure. As shown, the electronic device 1 of this embodiment is illustrated by taking the two-cell architecture shown in FIG. 1D in cooperation with the dimming structure 20 shown in FIG. 1F as an example to depict various modes of the electronic device 1. In FIG. 11, there is a controller 50 used to control the electronic device 1, and the controller 50 includes a first control unit 51, a second control unit 52 and a third control unit 53, wherein the first control unit 51 is electrically connected to the dye cell 201 of the dimming structure 20, the second control unit 52 is electrically connected to the scattering structure 10 to adjust the haze value of the scattering structure 10, and the third control unit 53 is electrically connected to the liquid crystal cell 202 of the dimming structure 20 to adjust the direction of the liquid crystal molecules of the liquid crystal cell 202. In this embodiment, the electronic device 1 further includes a first light sensing unit 12, and the first light sensing unit 12 is electrically connected to the controller 50 to detect the ambient light and send the ambient light signal to the first control unit 51, so as to adjust the transmittance of the dye cell 201 of the dimming structure 20. Alternatively, the electronic device 1 may not include the first light sensing unit 12, while the transmittance of the dye cell 201 of the dimming structure 20 may be manually adjusted by the user. In this embodiment, the first optical film 203 and the second optical film 204 in the dimming structure 20 have different polarization characteristics; for example, the first optical film 203 may only allow the light of the horizontal polarization state to pass through, and the second optical film 204 may only allow the light of the vertical polarization state to pass through. Therefore, by using the third control unit to adjust the direction of the liquid crystal molecules of the liquid crystal cell 202 to change from the first direction to the second direction or from the second direction to the first direction (where the first direction is defined as the long axis of the liquid crystal molecule being rotated from the axial direction of the first optical film 203 to the axial direction of the second optical film 204, or being rotated from the axial direction of the second optical film 204 to the axial direction of the first optical film 203, and the second direction is defined as the direction of the long axis of the liquid crystal molecule being parallel to the light traveling direction), so as to control whether the light can pass through the first optical film 203, the liquid crystal cell 202 and the second optical film 204 of the dimming structure 20. Furthermore, in cooperation with the second control unit 52 to adjust the haze value of the scattering structure 10 and the first control unit 51 to adjust the transmittance of the dye cell 201 of the dimming structure 20, it is able to realize the front projection mode, front/rear projection mode, dimming mode, etc. of the electronic device 1, as shown in FIG. 11.

Figure 12:
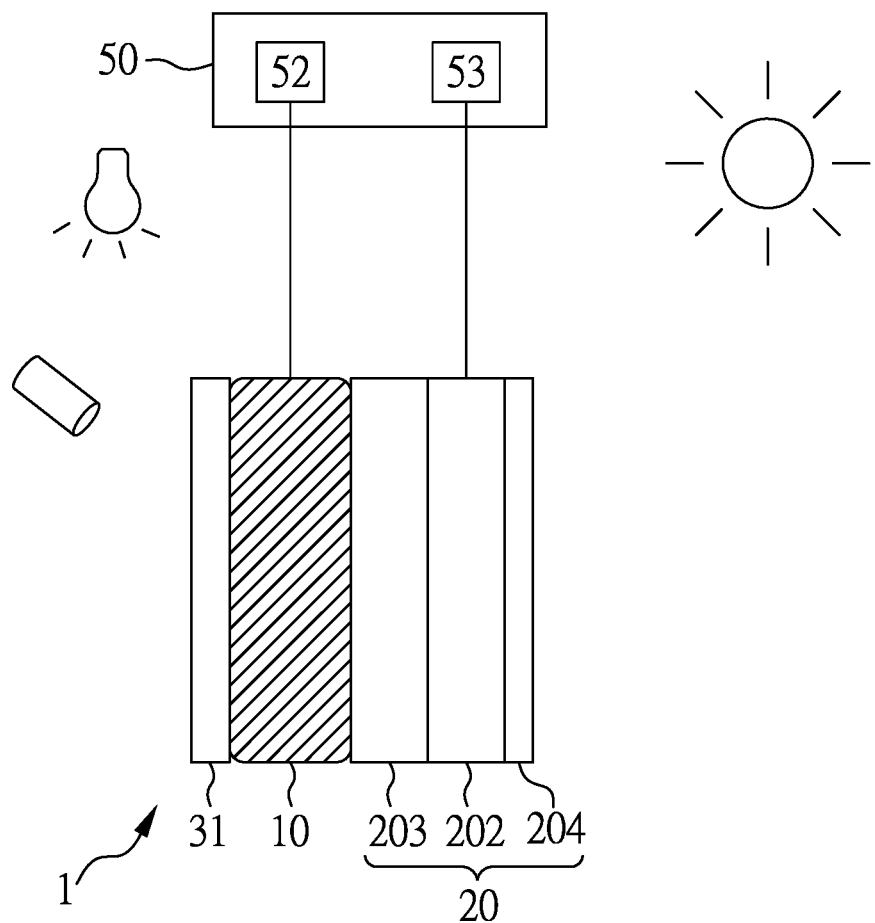
FIG. 12 shows the electronic device according to an embodiment of the present disclosure.

FIG. 12 shows the electronic device 1 according to an embodiment of the present disclosure. As shown, the electronic device 1 of this embodiment is illustrated by taking the two-cell architecture shown in FIG. 1D in cooperation with the dimming structure 20 shown in FIG. 1E as an example to depict various modes of the electronic device 1. In FIG. 12, there is a controller 50 used to control the electronic device 1, and the controller 50 includes a second control unit 52 and a third control unit 53. The second control unit 52 is electrically connected to the scattering structure 10 to adjust the haze value of the scattering structure 10, and the third control unit 53 is electrically connected to the liquid crystal cell 202 to adjust the direction of the liquid crystal molecules of the liquid crystal cell 202. In this embodiment, the first optical film 203 and the second optical film 204 in the dimming structure 20 have different polarization characteristics. For example, the first optical film 203 may only allow the light of the horizontal polarization state to pass through, and the second optical film 204 may only allow the light of the vertical polarization state to pass through. Therefore, by using the third control unit 53 to adjust the direction of the liquid crystal molecules of the liquid crystal cell 202 to change from the first direction to the second direction or from the second direction to the first direction (where the first direction is defined as the long axis of the liquid crystal molecule being rotated from the axial direction of the first optical film 203 to the axial direction of the second optical film 204, or being rotated from the axial direction of the second optical film 204 to the axial direction of the first optical film 203, and the second direction is defined as the direction of the long axis of the liquid crystal molecule being parallel to the light traveling direction), it is able to control whether the light can pass through the dimming structure 20 or nor. Furthermore, in cooperation with the second control unit 52 to adjust the haze value of the scattering structure 10, it is able to achieve the front projection mode, front/rear projection mode, light transmitting mode, etc. of the electronic device 1, as shown in FIG. 12.

From the above description, it is known that the electronic device 1 of the present disclosure is designed based on the main observers watching indoors and outdoors at the same time. Since both indoor and outdoor sides may need to be watched, it is necessary to reduce the reflectivity on both sides to reduce the influence of ambient light and increase the transmittance so as to allow the projection to pass through. Therefore, the dimming structures are provided on both sides to reduce the reflectivity, or anti-reflection films are used to reduce the influence of ambient light scattering, thereby providing improved image quality while satisfying the requirements of projection, shading privacy and transparent lighting.

Figure 13:
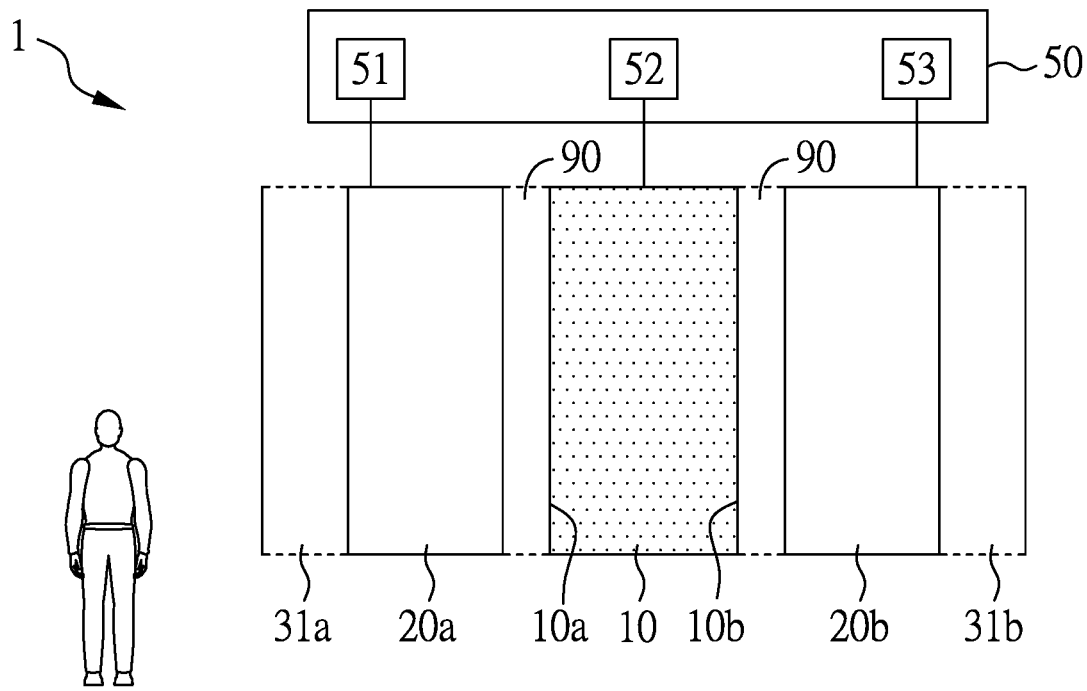
FIG. 13 shows the electronic device applied to a display according to an embodiment of the present disclosure.

Please refer to FIG. 13, which shows the electronic device 1 applied to a display according to an embodiment of the present disclosure. As shown, the electronic device 1 includes a scattering structure 10, a first dimming structure 20a, a second dimming structure 20b, and a controller 50. The scattering structure 10 has a first side 10a and a second side 10b opposite to the first side 10a. The first dimming structure 20a is arranged on the first side 10a of the scattering structure 10. The second dimming structure 20b is arranged on the second side 10b of the scattering structure 10. The controller 50 is electrically connected to the first dimming structure 20a and the second dimming structure 20b to adjust the transmittance of the first dimming structure 20a and the transmittance of the second dimming structure 20b. In one embodiment, the controller 50 includes a first control unit 51, a second control unit 52 and a third control unit 53. The first control unit 51 is electrically connected to the first dimming structure 20a to adjust the transmittance of the first dimming structure 20a, the second control unit 52 is electrically connected to the scattering structure 10 to adjust the haze of the scattering structure 10, and the third control unit 53 is electrically connected to the second dimming structure 20b to adjust the transmittance of the second dimming structure 20b.

In addition, optionally, the electronic device 1 may further include a first anti-reflection film 31a and a second anti-reflection film 31b, wherein the first anti-reflection film 31a is disposed on the side of the first dimming structure 20a away from the scattering structure 10, and the second anti-reflection film 31b is disposed on the side of the second dimming structure 20b away from the scattering structure 10. The reflectivity of the aforementioned anti-reflection film 31a (31b) is smaller than 2%, and the anti-reflection film 31a (31b) may be, for example, an AGAR coating, while this is only an example but not a limitation.

Figure 14:
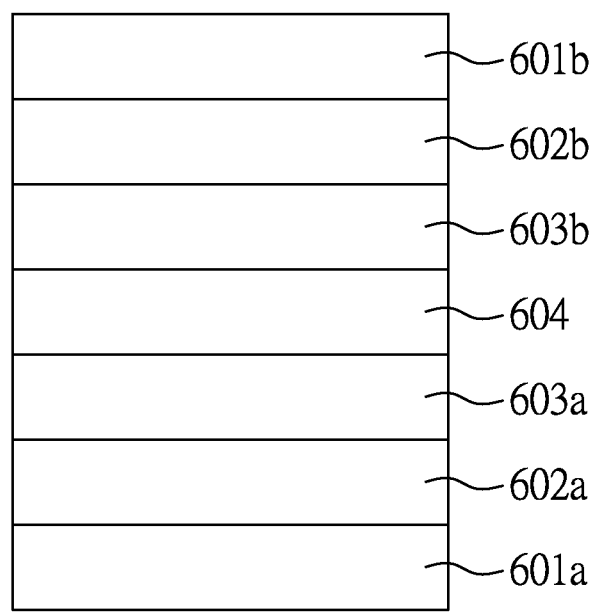
FIG. 14 is schematic diagram showing the dimming structure of the electronic device of FIG. 13.

FIG. 14 is a schematic diagram showing the dimming structure 20a (20b) of the electronic device 1 of this embodiment. As shown, the dimming structure 20a (20b) includes a first substrate 601a and a second substrate 601b, a first conductive layer 602a and a second conductive layer 602b respectively disposed on the first substrate 601a and the second substrate 601b, a first alignment layer 603a and a second alignment layer 603b respectively disposed on the first conductive layer 602a and the second substrate 601b, and a liquid crystal layer 604 disposed between the first substrate 601a and the second substrate 601b, or further disposed between the first alignment layer 603a and the second alignment layer 603b, wherein the material of the conductive layer 602a (602b) is, for example, indium tin oxide (ITO), and the substrate 601a (602b) is, for example, a glass substrate, while this is only an example but not a limitation. The conductive layer 602a (602b) of the dimming structure 20a (20b) may have a patterned design, or the conductive layer 602a (602b) may be designed as a whole piece of ITO, so as to reduce the chance of moire' phenomenon in the three-cell architecture.

Figures 15A, 15B:
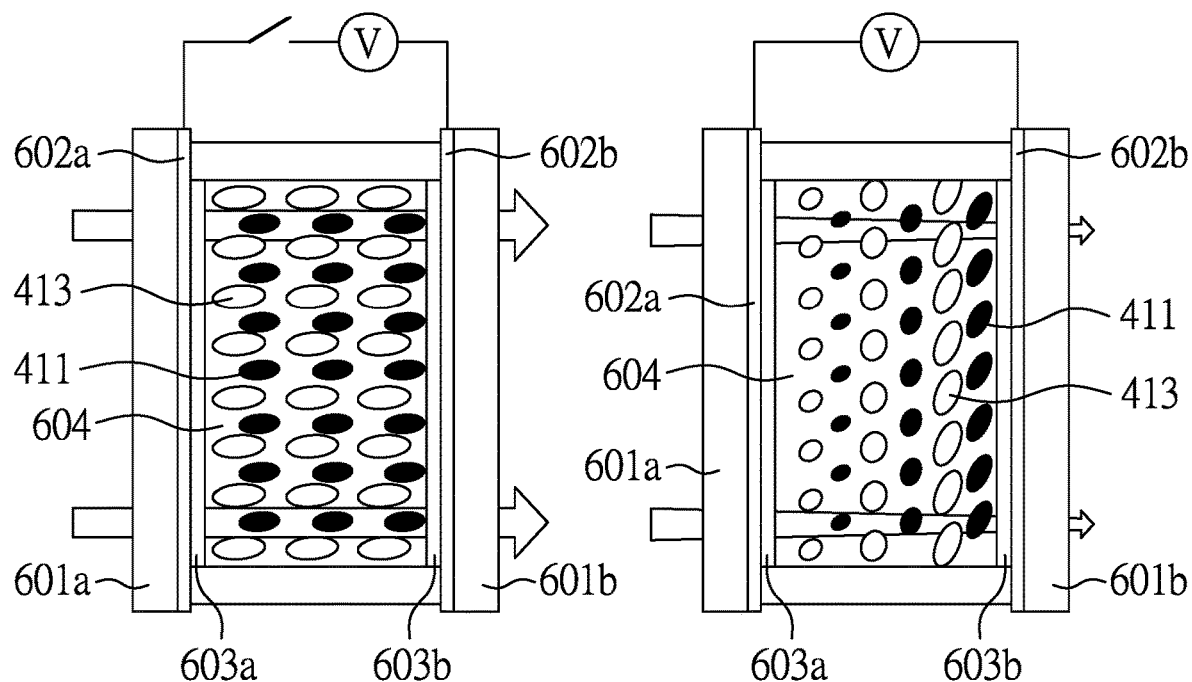
FIGS. 15A and 15B are schematic diagrams showing the dimming structure of the electronic device of FIG. 13.

FIGS. 15A and 15B are schematic diagrams showing the dimming structure 20a (20b) of the electronic device 1 of this embodiment, wherein the liquid crystal layer 604 of the dimming structure 20a (20b) includes a dichroic dyes 411 and liquid crystal molecules 413. As shown in FIG. 15A, when no voltage is applied between the first conductive layer 602a and the second conductive layer 602b, the long axes of the dichroic dye 411 and the liquid crystal molecule 413 are arranged in a direction substantially parallel to the light traveling direction. For example, relative to the Y axis, the long axes of the dichroic dye 411 and the liquid crystal molecule 413 has a pre-tilt angle of 85~89 degrees, so that most of the light is not absorbed by the dichroic dye 411, and thus the dimming structure 20a (20b) appears in a bright state. Therefore, the dimming structure 20a (20b) of this embodiment is a normally white dimming structure. As shown in FIG. 15B, when a specific voltage is applied between the first conductive layer 602a and the second conductive layer 602b, the long axes of the dichroic dye 411 and the liquid crystal molecule 413 are arranged in a direction substantially perpendicular to the light traveling direction, so that a large portion of the light is absorbed by the dichroic dye 411, and thus the dimming structure 20a (20b) appears in a dark state. Accordingly, the transmittance of the dimming structure 20a (20b) may be adjusted through voltage control, wherein the transmittance of the dimming structure 20a (20b) may be adjusted to be approximately 1%~70%.

Figure 16:
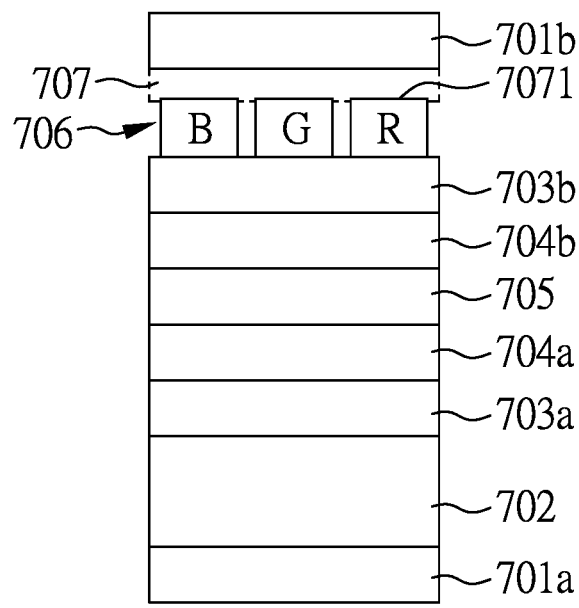
FIG. 16 is a schematic diagram showing the scattering structure of the electronic device of FIG. 13.

FIG. 16 is a schematic diagram showing the scattering structure 10 of the electronic device 1 of this embodiment.

As shown, the scattering structure 10 includes a first substrate 701a and a second substrate 701b, a metal conductive layer 702 disposed between the first substrate 701a and the second substrate 701b or further disposed on the first substrate 701a, a filter layer 706 disposed between the first substrate 701a and the second substrate 701b or further disposed on the second substrate 701b, a first transparent conductive layer 703a and a second transparent conductive layer 703b disposed between the first substrate 701a and the second substrate 701b or further disposed on the metal conductive layer 702 and the filter layer 706, a first alignment layer 704a and a second alignment layer 704b disposed between the first substrate 701a and the second substrate 701b or further respectively disposed on the first transparent conductive layer 703a and the second transparent conductive layer 703b, and a liquid crystal layer 705 disposed between the first substrate 701a and the second substrate 701b or further disposed between the first transparent conductive layer 703a and the second transparent conductive layer 703b, wherein the material of the transparent conductive layer 703a(703b) is, for example, indium tin oxide (ITO), and the transparent conductive layer 703a(703b) has a patterned design, that is, the transparent conductive layer 703a(703b) may be patterned to provide different pixels to display different information. The substrate 701a(701b) is, for example, a glass substrate, and the liquid crystal type of the liquid crystal layer 705 is, for example, PDLC (polymer dispersed liquid crystal), PNLC (polymer network liquid crystal), PSCT (polymer stabilized cholesterol texture), CLC (cholesteric liquid crystal), etc., but it is not limited thereto. Furthermore, the filter layer 706 includes, for example, a plurality of color resins 7061, and the plurality of color resins 7061 may include but not limited to red color resin (R), green color resin (G) and blue color resin (B). There are data lines, gate lines, etc. formed on the metal conductive layer 702 to drive the scattering structure 10 for display. In addition, optionally, the scattering structure 10 may further include a black matrix layer 707 disposed between the color resin layer 706 and the second substrate 701b, and the black matrix layer 707 may be formed with a plurality of openings 7071, so that the color resins 7061 are in the openings 7071 to clearly define the display of pixels.

Figure 17:
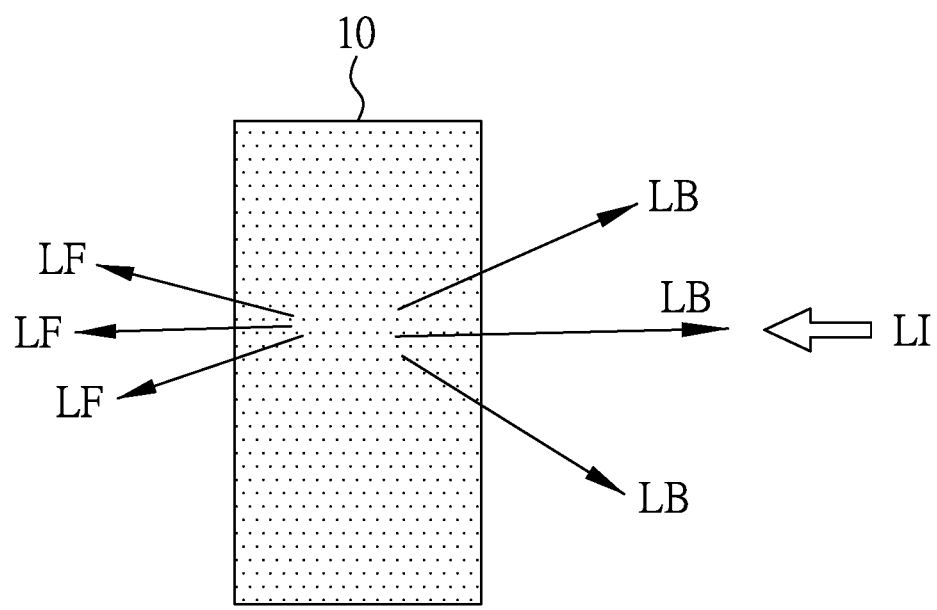
FIG. 17 is a schematic diagram showing the scattering effect and haze calculation of the scattering structure.

Accordingly, the scattering structure 10 of this embodiment may have the effects of double-sided display, single-sided display, and barricade. To illustrate these effects, FIG. 17 is a schematic diagram showing the scattering effect and haze calculation of the scattering structure 10. As shown, when the incident light (LI) enters the scattering structure 10 and is scattered to present forward scattering light (LF) and backward scattering light (LB), where the level of backward scattering may be regarded to be related to the reflectivity at each angle (Rsci) of the scattering structure 10, and the level of forward scattering can be regarded to be related to the transmittance at each angle (T.T %) of the scattering structure 10. Furthermore, by taking the incident light (LI) as an example of the collimated incident light that is collimated to the scattering structure 10, the scattered light (LF) after forward scattering has an intensity (f) (including the intensity of all angles), the collimated outgoing light constituted by the collimated incident light (LI) that passes through the scattering structure 10 in a collimated manner has an intensity (F) (for example, the intensity of the outgoing light of parallel incident light), and the haze of the scattering structure 10 is (f−F)/f, that is, haze=(f−F)÷f.

Therefore, please also refer to FIG. 13. In one example, when the backward scattering of the scattering structure 10 is relatively strong (Rsci>50%), by adjusting the transmittance (T %) of the first dimming structure 20a and the second dimming structure 20b, it is able to achieve single-sided visible and improve the ambient contrast ratio at the same time. Taking FIG. 13 as an example, if an observer is close to the position of the first dimming structure 20a and the electronic device 1 is desired to be switched to a reflective display, while providing the effects of being visible only to the observer and improved ambient contrast ratio, the controller 50 adjusts the first dimming structure 20a to a fully transparent state (T %>80%) to improve the ambient contrast ratio through the first anti-reflection film 31a, and the controller 50 switches the second dimming structure 20b to a dark state (T %<1%) to prevent other persons from seeing information on the side of the second diming structure 20b. If it is desired to switch the electronic device 1 to a transparent display mode, the controller 50 switches the first dimming structure 20a and the second dimming structure 20b on both sides to a fully transparent state (T %>80%), so as to achieve double-sided visible transparent display effect. In addition, if it is desired to switch the electronic device 1 to the privacy mode for use as a barricade, the controller 50 switches the scattering structure 10 to have a haze greater than 85% (haze>85%), and switches the first dimming structure 20a and the second dimming structure 20b to have a transmittance smaller than 1% (T %<1%).

In another embodiment, please continue to refer to FIG. 13. When the forward scattering of the scattering structure 10 is relatively strong (T.T %>50%) and the backward scattering is relatively weak (Rsci<50%), the controller is used to adjust the transmittance (T %) of the first dimming structure 20a to be T %=1~70% (the magnitude of the transmittance (T %) is adjusted according to the intensity of the ambient light), so as to reduce the influence of the reflected ambient light and improve the ambient contrast ratio. The controller 50 controls the second dimming structure 20b in a fully transparent state (T %>80%). For observers from the other side (near the second dimming structure 20b), since the first dimming structure 20a absorbs more light resulting in a weaker signal and lower contrast, it is difficult to see information. As described in the previous embodiment, if it is desired to switch the electronic device 1 to a transparent display mode, the controller 50 switches the first dimming structure 20a and the second dimming structure 20b on both sides to a fully transparent state (T %>80%), so as to achieve a double-sided visible transparent display effect. In addition, if it is desired to switch the electronic device 1 to the privacy mode for use as a barricade, the controller 50 switches the scattering structure 10 to have a haze greater than 85% (haze>85%), and switches the first dimming structure 20a and the second dimming structure 20b to have a transmittance smaller than 1% (T %<1%).

Please refer to FIG. 13 again. Optionally, the scattering structure 10 and the dimming structure 20a (20b) are bonded through glue 90. The material of the glue 90 may be PVB, NZB, etc., wherein, in order to avoid the loss of transmittance (T %), the difference between the refractive index (n value) of the glue 90 and the refractive index (n' value) of the substrate of the scattering structure 10 or dimming structure 20a(20b) that is in contact with the glue 90 must be smaller than or equal to 22%, or smaller than or equal to 18%. In detail, the calculation of the difference in refractive index may be |n−n'|/n*100%, and have to satisfy |n−n'|/n*100%≤22% so as to reduce interface reflection. For example, if the substrate is a glass with a refractive index of about 1.5, the refractive index (n value) of the glue 90 may be between 1.23 and 1.93.

Figure 18:
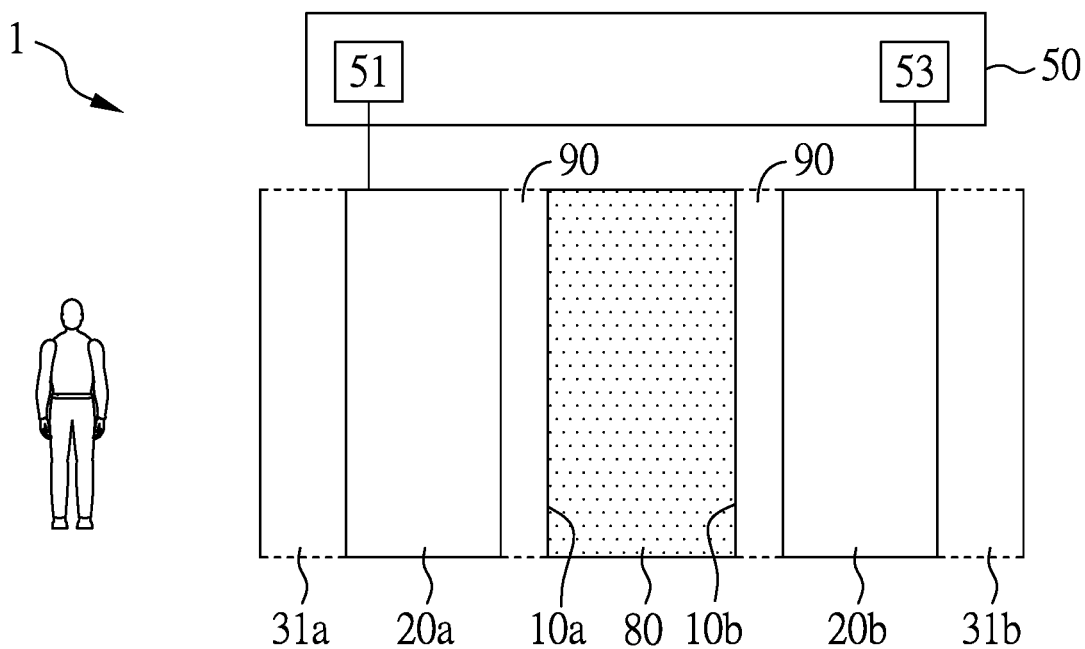
FIG. 18 shows the electronic device applied to a display according to another embodiment of the present disclosure.

The electronic device 1 of the present disclosure applied to a display may have different implementation aspects. FIG. 18 shows the electronic device 1 that is applied to a display according to another embodiment of the present disclosure, and please refer to FIG. 13 at the same time. The embodiment in FIG. 18 is generally applicable to the description of the embodiment in FIG. 13, and thus the following description will mainly focus on the differences.

Figure 19:
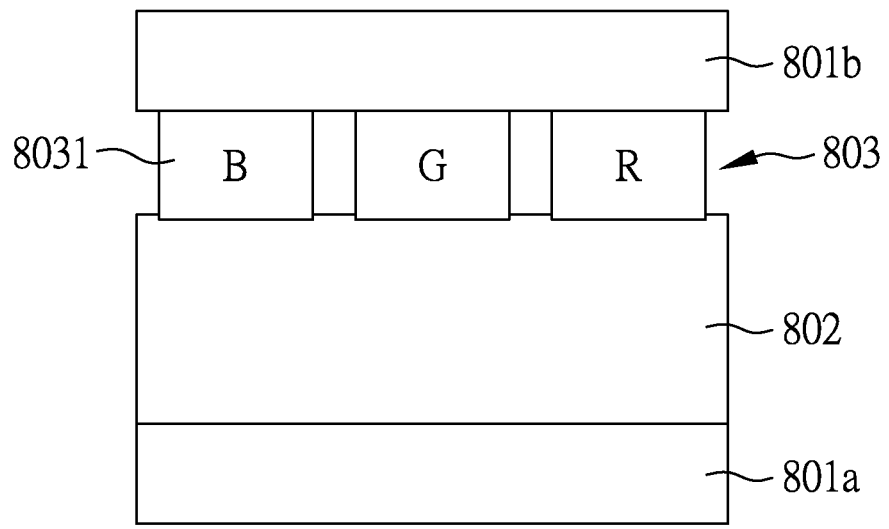
FIG. 19 is a schematic diagram showing the light emitting structure of the electronic device of FIG. 18.

In the embodiment of FIG. 18, a light emitting structure 80 is used to replace the scattering structure 10 of the embodiment of FIG. 13, and the controller 50 includes a first control unit 51 electrically connected to the first dimming structure 20a to adjust the transmittance of the first dimming structure 20a, and a third control unit 53 electrically connected to the second dimming structure 20b to adjust the transmittance of the second dimming structure 20b. FIG. 19 is a schematic diagram further showing the light emitting structure 80 of the electronic device 1 of this embodiment. As shown, the light emitting structure 80 may include a first substrate 801a and a second substrate 801b, a metal conductive layer 802 disposed between the first substrate 801a and the second substrate 801b or further disposed on the first substrate 801a, and a light emitting layer 803 disposed between the first substrate 801a and the second substrate 801b or further disposed between the first substrate 801a and the metal conductive layer 802. The first substrate 701a and the second substrate 701b are, for example, flexible substrates or rigid substrates, but it is not limited thereto. The light emitting layer 803 may include a plurality of light emitting units 7061, and the light emitting unit 7061 may include, for example, organic light emitting diode (LED), sub-millimeter light emitting diode (mini LED), micro light emitting diode (micro LED) or quantum dot light emitting diode (quantum dot LED), or a combination thereof, but it is not limited thereto. The plurality of light emitting units 7061 may include but not limited to a red light emitting unit (R), a green light emitting unit (G) and a blue light emitting unit (B), but the present disclosure is not limited thereto, while data lines and gate lines may be formed on the metal conductive layer 8072 to drive the light emitting structure 80 for display. Similar to the previous embodiment, with the structure of this embodiment, it is able to achieve the effects of double-sided display, single-sided display and barricade and improve the ambient contrast ratio at the same time, while the description can be known from the illustration of the previous embodiment, and thus the details are not repeated here.

As long as the features of the various embodiments disclosed in the present disclosure do not violate the spirit of the disclosure or conflict with each other, they can be mixed and matched arbitrarily.

The aforementioned specific embodiments should be construed as merely illustrative, and not limiting the rest of the present disclosure in any way.

The invention claimed is:

1. An electronic device, comprising:
   a scattering structure;
   a dimming structure disposed on the scattering structure;
   a controller including a first control unit electrically connected to the dimming structure for adjusting a transmittance of the dimming structure;
   a first anti-reflection film and a second anti-reflection film, wherein the scattering structure and the dimming structure are disposed between the first anti-reflection film and the second anti-reflection film, and each of the first anti-reflection film and the second anti-reflection film has a reflectivity of smaller than 2%.

2. The electronic device as claimed in claim 1, further comprising a light sensing unit electrically connected to the controller for detecting an ambient light, wherein the light sensing unit transmits an ambient light signal to the first control unit, and the first control unit adjusts the transmittance of the dimming structure based on the ambient light signal.

3. The electronic device as claimed in claim 1, wherein the controller further comprises a second control unit electrically connected to the scattering structure for adjusting a haze value of the scattering structure.

4. The electronic device as claimed in claim 1, wherein the dimming structure includes dichroic dyes and liquid crystal molecules.

5. The electronic device as claimed in claim 1, wherein the dimming structure includes a first optical film, a liquid crystal cell and a second optical film, wherein the liquid crystal cell is arranged between the first optical film and the second optical film.

6. The electronic device as claimed in claim 1, wherein the scattering structure has a liquid crystal state of PDLC (polymer dispersed liquid crystal), PSCT (polymer stabilized cholesterol texture), PNLC (polymer network liquid crystal) or CLC (cholesteric liquid crystal).

7. An electronic device, comprising:
   a scattering structure;
   a first dimming structure disposed on the scattering structure;
   wherein a combination of the scattering structure and the first dimming structure has a transmittance of between 1% and 70%;
   a first anti-reflection film and a second anti-reflection film, wherein the scattering structure and the first dimming structure are disposed between the first anti-reflection film and the second anti-reflection film, and each of the first anti-reflection film and the second anti-reflection film has a reflectivity of smaller than 2%.

8. The electronic device as claimed in claim 7, wherein the first dimming structure includes dichroic dyes and liquid crystal molecules.

9. The electronic device as claimed in claim 7, further comprising a second dimming structure, wherein the scattering structure is disposed between the first dimming structure and the second dimming structure, and a combination of the first dimming structure, the scattering structure and the second dimming structure has a transmittance of 0.01%~60%.

10. The electronic device as claimed in claim 9, wherein the second dimming structure includes dichroic dyes and liquid crystal molecules.

11. The electronic device as claimed in claim 7, wherein the scattering structure includes:
   a first substrate;
   a second substrate disposed corresponding to the first substrate;
   a liquid crystal layer disposed between the first substrate and the second substrate;
   a first conductive layer disposed on the first substrate; and
   a first intermediate layer disposed between the first substrate and the first conductive layer;
   wherein a refractive index of the first intermediate layer is between a refractive index of the first substrate and a refractive index of the first conductive layer.

12. An electronic device, comprising:
a scattering structure having a first side and a second side opposite to the first side;
a first dimming structure disposed on the first side of the scattering structure;
a second dimming structure disposed on the second side of the scattering structure;
a controller electrically connected to the first dimming structure and the second dimming structure for adjusting a transmittance of the first dimming structure and a transmittance of the second dimming structure;
a first anti-reflection film and a second anti-reflection film, wherein the first anti-reflection film is arranged on one side of the first dimming structure away from the scattering structure, the second anti-reflection film is arranged on one side of the second dimming structure away from the scattering structure, and each of the first anti-reflection film and the second anti-reflection film has a reflectivity of smaller than 2%.

13. The electronic device as claimed in claim 12, wherein the transmittance of the first dimming structure is greater than 80%, and the transmittance of the second dimming structure is smaller than 1%.

14. The electronic device as claimed in claim 12, wherein the transmittance of the first dimming structure is 1~70%, and the transmittance of the second dimming structure is greater than 80%.

15. The electronic device as claimed in claim 12, wherein the scattering structure includes: a first transparent conductive layer and a second transparent conductive layer; and a liquid crystal layer disposed between the first transparent conductive layer and the second transparent conductive layer.

16. The electronic device as claimed in claim 15, wherein the liquid crystal layer has a liquid crystal state of PDLC (polymer dispersed liquid crystal), PSCT (polymer stabilized cholesterol texture), PNLC (polymer network liquid crystal) or CLC (cholesteric liquid crystal).

17. An electronic device, comprising:
a light emitting structure having a first side and a second side opposite to the first side;
a first dimming structure disposed on the first side of the light emitting structure;
a second dimming structure disposed on the second side of the light emitting structure;
a controller electrically connected to the first dimming structure and the second dimming structure for adjusting a transmittance of the first dimming structure and a transmittance of the second dimming structure;
a first anti-reflection film and a second anti-reflection film, wherein the first anti-reflection film is arranged on one side of the first dimming structure away from the light emitting structure, the second anti-reflection film is arranged on one side of the second dimming structure away from the light emitting structure, and each of the first anti-reflection film and the second anti-reflection film has a reflectivity of smaller than 2%.

* * * * *